(12) United States Patent
Saito et al.

(10) Patent No.: US 8,812,467 B2
(45) Date of Patent: Aug. 19, 2014

(54) INFORMATION PROCESSING APPARATUS AND COMPUTER READABLE MEDIUM FOR PERFORMING HISTORY CANCELLATION PROCESSING

(75) Inventors: Takahiro Saito, Kanagawa (JP);
Shigehisa Kawabe, Kanagawa (JP);
Setsu Kunitake, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 260 days.

(21) Appl. No.: 13/480,820

(22) Filed: May 25, 2012

(65) Prior Publication Data
US 2013/0166579 A1 Jun. 27, 2013

(51) Int. Cl.
*G06F 7/00* (2006.01)
*G06F 17/00* (2006.01)

(52) U.S. Cl.
USPC ............ 707/703; 707/758; 707/802; 707/803

(58) Field of Classification Search
USPC ............... 707/694, 703, 758, 802, 803, 999.2
See application file for complete search history.

(56) References Cited

U.S. PATENT DOCUMENTS

| | | | | |
|---|---|---|---|---|
| 6,745,237 | B1 * | 6/2004 | Garrity et al. | 709/219 |
| 7,257,595 | B2 * | 8/2007 | Verma et al. | 707/683 |
| 2005/0071384 | A1 * | 3/2005 | Cotner et al. | 707/200 |
| 2007/0061377 | A1 | 3/2007 | Tani | |
| 2007/0198792 | A1 * | 8/2007 | Dice et al. | 711/163 |
| 2008/0256137 | A1 * | 10/2008 | Kawamura et al. | 707/200 |
| 2013/0120439 | A1 * | 5/2013 | Harris et al. | 345/619 |

FOREIGN PATENT DOCUMENTS

| | | | | |
|---|---|---|---|---|
| JP | 2007-79640 | A | 3/2007 | |
| JP | 2007-094517 | A | 4/2007 | |
| JP | 2007-094517 | * | 4/2012 | G06Q 10/00 |

* cited by examiner

*Primary Examiner* — Hares Jami
(74) *Attorney, Agent, or Firm* — Sughrue Mion, PLLC

(57) ABSTRACT

An information processing apparatus includes a detecting unit and a history processing unit. The detecting unit detects a first operation and a second operation. The first operation is an operation of inputting a document to an electronic tray. The second operation is an operation of retrieving a document from the electronic tray. The history processing unit performs a predetermined process related to cancellation history in a case where an operation detected by the detecting unit is the second operation, if history information indicates that the first operation has already been performed, if document identification information indicating a document on which the first operation has been performed matches document identification information indicating a document on which the second operation has been performed, and if operator identification information indicating an operator who has performed the first operation matches operator identification information indicating an operator who has performed the second operation.

14 Claims, 15 Drawing Sheets

FIG. 4A
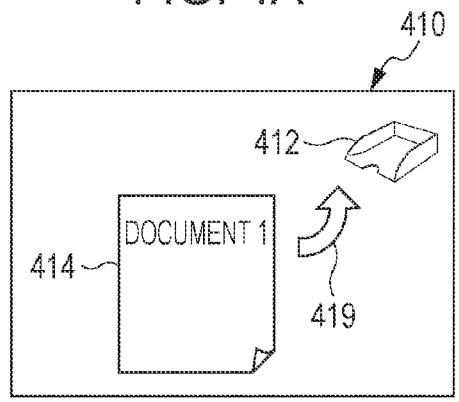
FIG. 4B
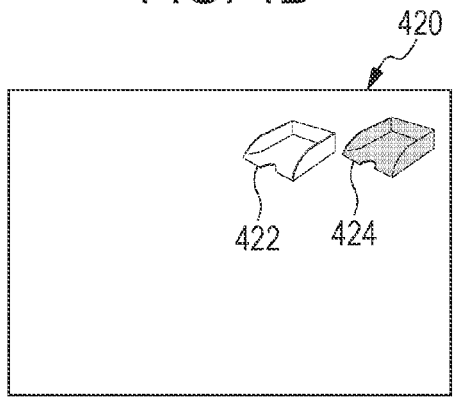
FIG. 5A
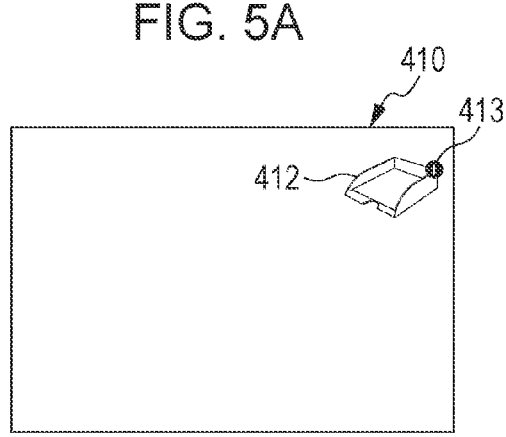
FIG. 5B
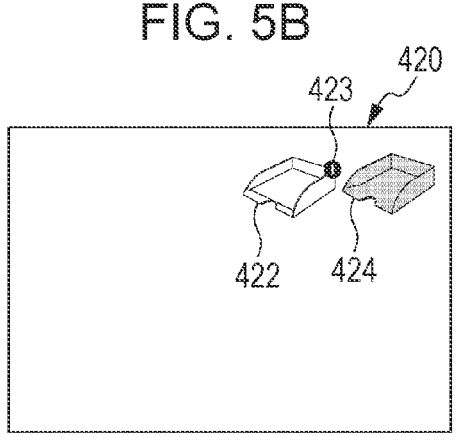
FIG. 6
| DOCUMENT NAME (ID) | USER NAME (ID) | DATE AND TIME | TRAY NAME (ID) | OPERATION NAME | STATUS |
|---|---|---|---|---|---|
| DOCUMENT 1 | USER 1 | 12.1.2011 10:00 | RECEPTION TRAY | INPUT | SUBMITTED |

FIG. 7A
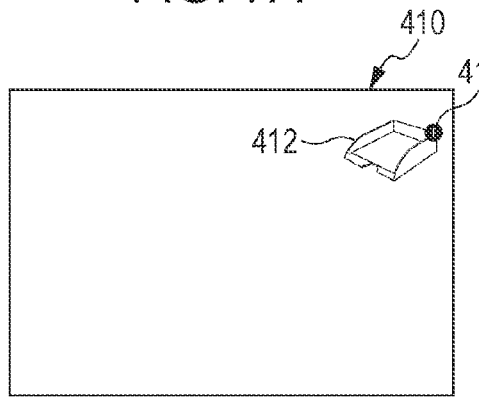
FIG. 7B
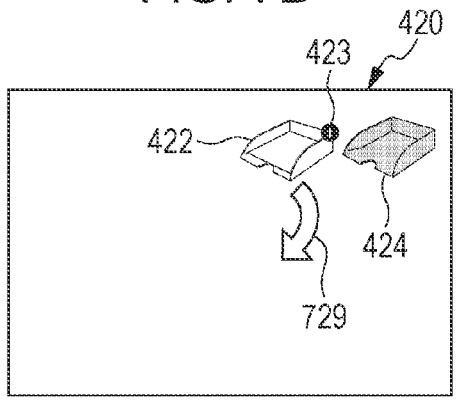
FIG. 8A
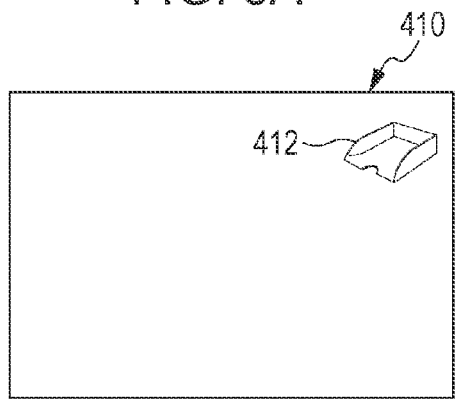
FIG. 8B
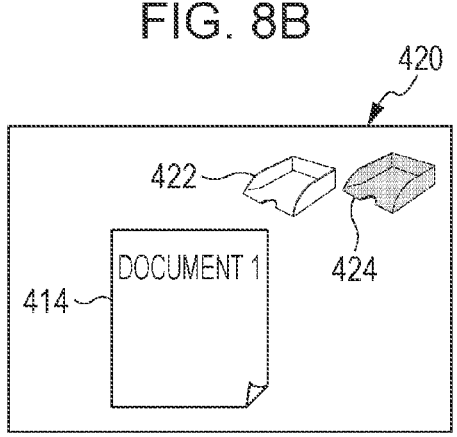
FIG. 9
| DOCUMENT NAME (ID) | USER NAME (ID) | DATE AND TIME | TRAY NAME (ID) | OPERATION NAME | STATUS |
|---|---|---|---|---|---|
| DOCUMENT 1 | USER 1 | 12.1.2011 10:00 | RECEPTION TRAY | INPUT | SUBMITTED |
| DOCUMENT 1 | USER 2 | 12.1.2011 10:30 | RECEPTION TRAY | RETRIEVAL | RECEIVED |

FIG. 12

| DOCUMENT NAME (ID) | USER NAME (ID) | DATE AND TIME | TRAY NAME (ID) | OPERATION NAME | STATUS |
|---|---|---|---|---|---|
| DOCUMENT 1 | USER 1 | 12.1.2011 10:00 | RECEPTION TRAY | INPUT | SUBMITTED |
| DOCUMENT 1 | USER 2 | 12.1.2011 10:30 | RECEPTION TRAY | RETRIEVAL | RECEIVED |
| DOCUMENT 1 | USER 2 | 12.1.2011 11:30 | DECISION TRAY | INPUT | DECIDED |

| DOCUMENT NAME (ID) | USER NAME (ID) | DATE AND TIME | TRAY NAME (ID) | OPERATION NAME | STATUS |
|---|---|---|---|---|---|
| ▶ DOCUMENT 1 | USER 2 | 12.1.2011 11:30 | DECISION TRAY | INPUT | DECIDED |

| DOCUMENT NAME (ID) | USER NAME (ID) | DATE AND TIME | TRAY NAME (ID) | OPERATION NAME | STATUS |
|---|---|---|---|---|---|
| ▼ DOCUMENT 1 | USER 2 | 12.1.2011 11:30 | DECISION TRAY | INPUT | DECIDED |
|  | USER 2 | 12.1.2011 10:30 | RECEPTION TRAY | RETRIEVAL | RECEIVED |
|  | USER 1 | 12.1.2011 10:00 | RECEPTION TRAY | INPUT | SUBMITTED |

(1410, 1420, 1430, 1440, 1450, 1460, 1400, 1412)

FIG. 15A
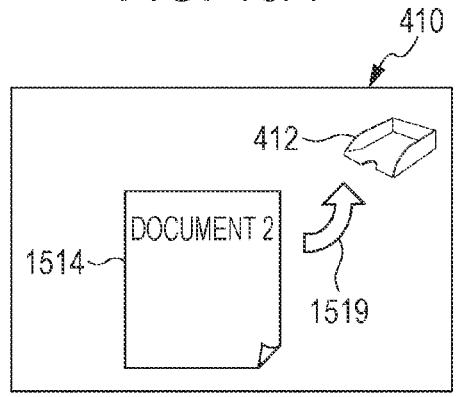
FIG. 15B
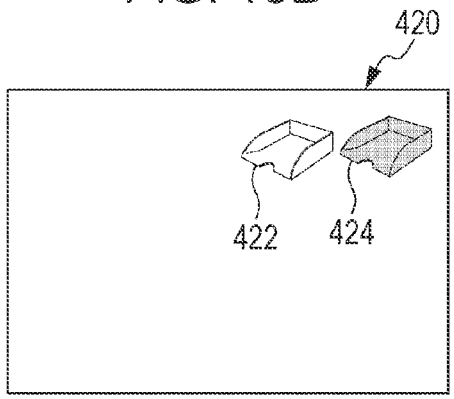
FIG. 16A
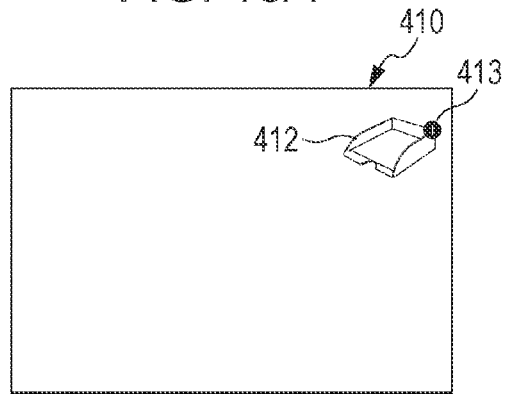
FIG. 16B
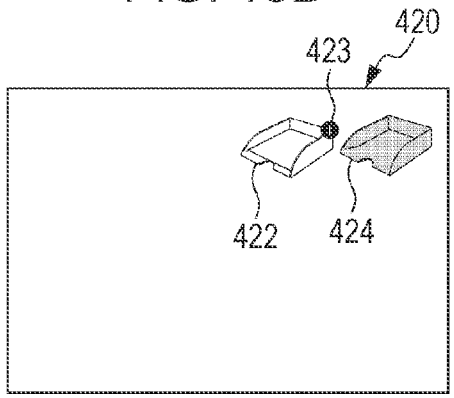
FIG. 17
| DOCUMENT NAME (ID) | USER NAME (ID) | DATE AND TIME | TRAY NAME (ID) | OPERATION NAME | STATUS |
|---|---|---|---|---|---|
| DOCUMENT 1 | USER 1 | 12.1.2011 10:00 | RECEPTION TRAY | INPUT | SUBMITTED |
| DOCUMENT 1 | USER 2 | 12.1.2011 10:30 | RECEPTION TRAY | RETRIEVAL | RECEIVED |
| DOCUMENT 1 | USER 2 | 12.1.2011 11:30 | DECISION TRAY | INPUT | DECIDED |
| DOCUMENT 2 | USER 1 | 12.2.2011 10:00 | RECEPTION TRAY | INPUT | SUBMITTED |

FIG. 18A
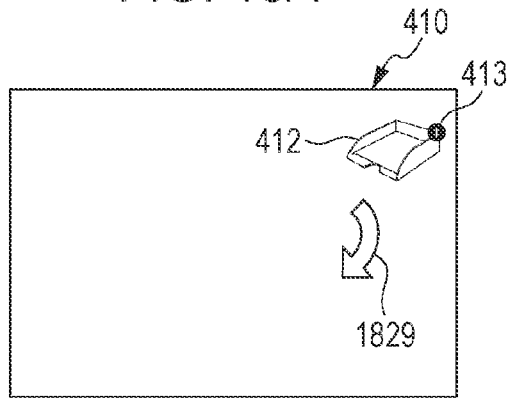
FIG. 18B
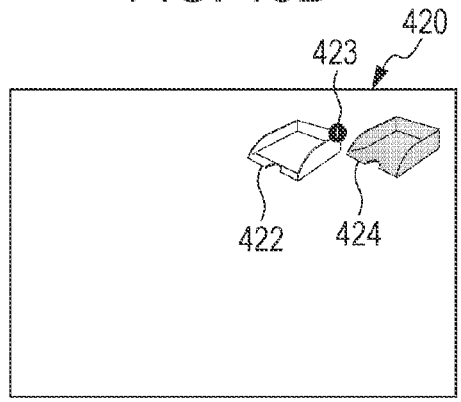
FIG. 19A
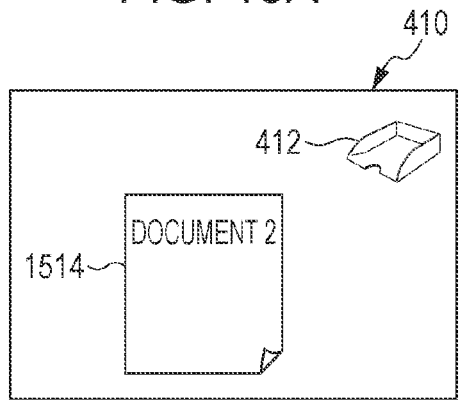
FIG. 19B
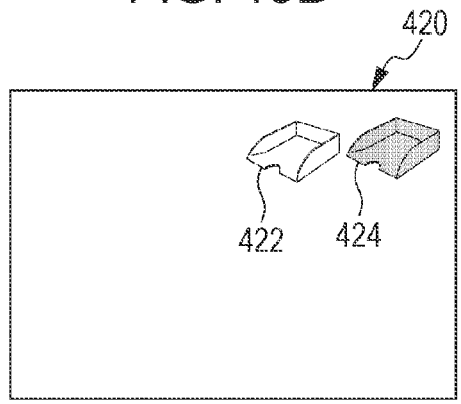
FIG. 20
| DOCUMENT NAME (ID) | USER NAME (ID) | DATE AND TIME | TRAY NAME (ID) | OPERATION NAME | STATUS |
|---|---|---|---|---|---|
| DOCUMENT 1 | USER 1 | 12.1.2011 10:00 | RECEPTION TRAY | INPUT | SUBMITTED |
| DOCUMENT 1 | USER 2 | 12.1.2011 10:30 | RECEPTION TRAY | RETRIEVAL | RECEIVED |
| DOCUMENT 1 | USER 2 | 12.1.2011 11:30 | DECISION TRAY | INPUT | DECIDED |

FIG. 21

| DOCUMENT NAME (ID) | USER NAME (ID) | DATE AND TIME | TRAY NAME (ID) | OPERATION NAME | STATUS |
|---|---|---|---|---|---|
| DOCUMENT 1 | USER 1 | 12.1.2011 10:00 | RECEPTION TRAY | INPUT | SUBMITTED |
| DOCUMENT 1 | USER 2 | 12.1.2011 10:30 | RECEPTION TRAY | RETRIEVAL | RECEIVED |
| DOCUMENT 1 | USER 2 | 12.1.2011 11:30 | DECISION TRAY | INPUT | DECIDED |
| DOCUMENT 2 | USER 1 | 12.2.2011 10:00 | RECEPTION TRAY | INPUT | SUBMITTED |
| DOCUMENT 2 | USER 1 | 12.2.2011 10:10 | RECEPTION TRAY | RETRIEVAL | SUBMISSION CANCELED |

FIG. 22

| DOCUMENT NAME (ID) | USER NAME (ID) | DATE AND TIME | TRAY NAME (ID) | OPERATION NAME | STATUS |
|---|---|---|---|---|---|
| ▶ DOCUMENT 1 | USER 2 | 12.1.2011 11:30 | DECISION TRAY | INPUT | DECIDED |
| ▶ DOCUMENT 2 | USER 1 | 12.2.2011 10:10 | RECEPTION TRAY | RETRIEVAL | SUBMISSION CANCELED |

FIG. 23

| DOCUMENT NAME (ID) | USER NAME (ID) | DATE AND TIME | TRAY NAME (ID) | OPERATION NAME | STATUS |
|---|---|---|---|---|---|
| ▶ DOCUMENT 1 | USER 2 | 12.1.2011 11:30 | DECISION TRAY | INPUT | DECIDED |
| ▼ DOCUMENT 2 | USER 1 | 12.2.2011 10:10 | RECEPTION TRAY | RETRIEVAL | SUBMISSION CANCELED |
|  | USER 1 | 12.2.2011 10:00 | RECEPTION TRAY | INPUT | SUBMITTED |

FIG. 24

| OPERATION NAME (ID) | STATUS |
|---|---|
| INPUT | SUBMITTED |
| RETRIEVAL | RECEIVED |

| OPERATION NAME (ID) | STATUS |
|---|---|
| INPUT | RECEPTION CANCELED |
| RETRIEVAL | SUBMISSION CANCELED |

- 2610 — DOCUMENT ID: DOCUMENT 2
- 2620 — USER ID: USER 1
- 2630 — TRAY ID: RECEPTION TRAY
- 2640 — OPERATION NAME: RETRIEVAL
- 2650 — DATE AND TIME: 12.2.2011 10:10

FIG. 27

```
2710 —— DOCUMENT ID: DOCUMENT 2          2700
2720 —— USER ID: USER 1
2730 —— TRAY ID: RECEPTION TRAY
2740 —— OPERATION NAME: INPUT
2750 —— DATE AND TIME: 12.2.2011 10:10
2760 —— STATUS: SUBMITTED
```

FIG. 28

| USER NAME (ID) | GROUP NAME (ID) |
|---|---|
| USER 1 | GROUP A |
| USER 2 | GROUP A |
| USER 3 | GROUP B |
| ⋮ | ⋮ |

| USER NAME (ID) | AUTHORITY |
|---|---|
| USER 1 | PERSON IN CHARGE |
| USER 2 | SECTION MANAGER |
| USER 3 | SECTION MANAGER |
| ⋮ | ⋮ |

2910 / 2920 / 2900

US 8,812,467 B2

INFORMATION PROCESSING APPARATUS AND COMPUTER READABLE MEDIUM FOR PERFORMING HISTORY CANCELLATION PROCESSING

CROSS-REFERENCE TO RELATED APPLICATIONS

This application is based on and claims priority under 35 USC 119 from Japanese Patent Application No. 2011-279483 filed Dec. 21, 2011.

BACKGROUND (i) Technical Field

The present invention relates to an information processing apparatus and a computer readable medium.

(ii) Related Art

Technologies for managing a flow of processing a document are available.

SUMMARY

According to an aspect of the invention, there is provided an information processing apparatus including a detecting unit and a history processing unit. The detecting unit detects a first operation and a second operation. The first operation is an operation of inputting a document to an electronic tray that stores a document. The second operation is an operation of retrieving a document from the electronic tray. The history processing unit performs a predetermined process related to cancellation history in a case where an operation detected by the detecting unit is the second operation, if history information indicates that the first operation has already been performed, if document identification information indicating a document on which the first operation has been performed matches document identification information indicating a document on which the second operation has been performed, and if operator identification information indicating an operator who has performed the first operation matches operator identification information indicating an operator who has performed the second operation.

BRIEF DESCRIPTION OF THE DRAWINGS

An exemplary embodiment of the present invention will be described in detail based on the following figures, wherein:

FIGS. 4A and 4B are diagrams illustrating an example of a process according to the exemplary embodiment;

FIGS. 5A and 5B are diagrams illustrating an example of a process according to the exemplary embodiment;

FIG. 6 is a diagram illustrating an example of the data structure of tray history data;

FIGS. 7A and 7B are diagrams illustrating an example of a process according to the exemplary embodiment;

FIGS. 8A and 8B are diagrams illustrating an example of a process according to the exemplary embodiment;

FIG. 9 is a diagram illustrating an example of the data structure of tray history data;

FIG. 12 is a diagram illustrating an example of the data structure of tray history data;

FIG. 13 is a diagram illustrating an example of a status display screen;

FIG. 14 is a diagram illustrating an example of a status display screen;

FIGS. 15A and 15B are diagrams illustrating an example of a process according to the exemplary embodiment;

FIGS. 16A and 16B are diagrams illustrating an example of a process according to the exemplary embodiment;

FIG. 17 is a diagram illustrating an example of the data structure of tray history data;

FIGS. 18A and 18B are diagrams illustrating an example of a process according to the exemplary embodiment;

FIGS. 19A and 19B are diagrams illustrating an example of a process according to the exemplary embodiment;

FIG. 20 is a diagram illustrating an example of the data structure of tray history data;

FIG. 21 is a diagram illustrating an example for the data structure of tray history data;

FIG. 22 is a diagram illustrating an example of a status display screen;

FIG. 23 is a diagram illustrating an example of a status display screen;

FIG. 24 is a diagram illustrating an example of the data structure of a status definition table for a reception tray;

FIG. 25 is a diagram illustrating an example of the data structure of a status definition table for a reception tray;

FIG. 26 is a diagram illustrating an example of the data structure of operation history data;

FIG. 27 is a diagram illustrating an example of the data structure of operation history data;

FIG. 28 is a diagram illustrating an example of the data structure of a group definition table;

FIG. 29 is a diagram illustrating an example of the data structure of an authority definition table;

DETAILED DESCRIPTION

Hereinafter, an exemplary embodiment for realizing the present invention will be described with reference to the drawings.

Figure 1:
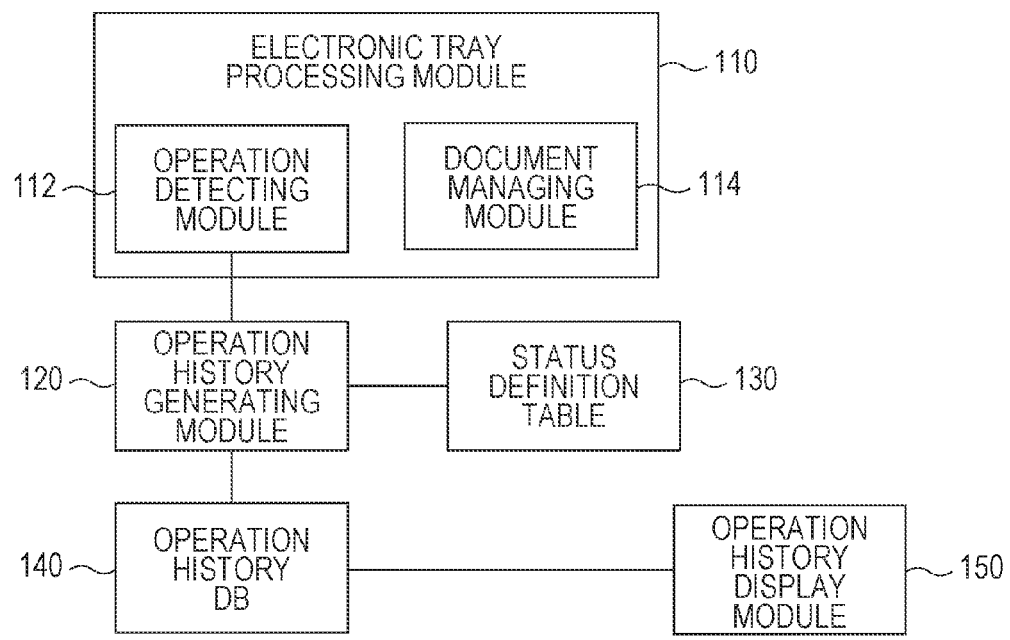
FIG. 1 is a conceptual module configuration diagram of an example configuration according to an exemplary embodiment of the present invention.

FIG. 1 is a conceptual module configuration diagram illustrating an example configuration according to the exemplary embodiment.

In general, "modules" are components of software (computer program) or hardware that may be logically separated from one another. Thus, the modules according to the exemplary embodiment correspond to not only modules in a computer program but also modules in a hardware configuration. Therefore, the description of the exemplary embodiment includes a description of a computer program for causing a computer to function as those modules (a program for causing a computer to execute individual program steps, a program for causing a computer to function as individual units, or a program for causing a computer to realize individual functions), a system, and a method. For the convenience of description, expressions "store", "cause . . . to store", and expressions equivalent thereto will be used. These expressions specifically mean "cause a storage device to store" or "perform control to cause a storage device to store" in the case of a computer program. The modules may correspond to functions in a one-to-one relationship. In terms of packaging, a single module may be constituted by a single program, plural modules may be constituted by a single program, or a single module may be constituted by plural programs. Also, plural modules may be executed by a single computer, or a single module may be executed by plural computers in a distributed or parallel environment. Alternatively, a single module may include another module. Hereinafter, "connection" is used to refer to a logical connection (transmission and reception of data, providing an instruction, a reference relationship between pieces of data, etc.), as well as a physical connection. "Predetermined" means being determined before a certain operation, and includes the meaning of being determined in accordance with a present situation/state or in accordance with a previous situation/state before a certain operation after processing according to the exemplary embodiment starts, as well as before processing according to the exemplary embodiment starts. A description having the meaning "in the case of A, B is performed" is used as the meaning "whether A or not is determined, and B is performed if it is determined A", except for a case where determination of whether A or not is unnecessary.

A system or apparatus may be realized by plural computers, hardware units, devices, or the like connected to one another via a communication medium, such as a network (including communication connections having a one-to-one correspondence), or may be realized by a single computer, hardware unit, device, or the like. "Apparatus" and "system" are used synonymously. Of course, "system" does not include a man-made social "organization" (social system).

Also, target information is read from a storage device in individual processing operations performed by respective modules or in individual processing operations performed by a single module. After each processing operation has ended, the processing result thereof is written into the storage device. Thus, a description of reading from the storage device before a processing operation and writing into the storage device after a processing operation may be omitted. Here, examples of the storage device include a hard disk, a random access memory (RAM), an external storage medium, a storage device connected through a communication line, a register in a central processing unit (CPU), and the like.

In order to simplify the description, an expression such as "user performs" is used. In the exemplary embodiment, this means detecting an event performed by a user and performing a process corresponding to the event.

An information processing apparatus according to the exemplary embodiment transmits and receives an electronic document (hereinafter simply referred to as a "document") via an electronic tray. As illustrated in FIG. 1, the information processing apparatus includes an electronic tray processing module 110, an operation history generating module 120, a status definition table 130, an operation history database (DB) 140, and an operation history display module 150.

Here, a document is text data, a still image, a moving image, electronic audio data, or a combination thereof. The document may be stored, edited, and searched for, and may be transmitted and received as an independent unit between systems or uses, and includes anything similar thereto. Also, the document has a document identifier (also referred to as a "document ID") with which the document is uniquely identifiable in the exemplary embodiment.

The electronic tray processing module 110 includes an operation detecting module 112 and a document managing module 114.

An electronic tray is used to transmit a document from a user 1 to a user 2. The user 1 and user 2 are capable of accessing the same electronic tray. The user 1 or user 2 is capable of inputting a document to the electronic tray and retrieving the document from the electronic tray. The electronic tray provides the following four functions.

(1) The user 1 has a handle of an electronic tray 1 and is capable of inputting a document to the electronic tray 1 and displaying a list of documents therein. The user 2 has (shares) the handle of the electronic tray 1 and is capable of displaying a list of documents therein and retrieving a document therefrom.

(2) The user 1 inputs a document 1 to the electronic tray 1, and thereby the document 1 is included in a list for the electronic tray 1.

(3) The user 2 retrieves the document 1 in the list for the electronic tray 1 from the electronic tray 1, and thereby the document 1 disappears from the list for the electronic tray 1.

(4) After the user 1 has input the document 1 to the electronic tray 1, the document 1 is an only existence until the user 2 retrieves the document 1 from the electronic tray 1. Even if the same user sequentially inputs two identical documents, one of the two documents is not overwritten by the other, and the two documents are handled as separate documents. Thus, if the user 2 retrieves the document 1, the document 1 is not retrieved by a user other than the user 2. In order to make a document an only existence in an electronic tray, new identification information may be assigned to the document when the document is input to the electronic tray, so that the document is identifiable in the electronic tray, and the document may be stored therein. The new identification information in the electronic tray is different from a document ID, and may allow the document to be identifiable only in the electronic tray. The document ID is not changed through interaction using an electronic tray, and is used to determine whether or not the origin of the document that is input is the same as the origin of the document that is retrieved, as described below.

Examples of a method for inputting a document to an electronic tray include a method for moving a document using a movement method of a file system, and a method for copying a document using a copying method. In any of these methods, an original document may be deleted after the document has been input to an electronic tray. When the copying method is used, the original document may not be deleted. A document generated through copying may have the same document ID as the original document. Alternatively, a document generated through copying may be input to an electronic tray after assigning a new document ID, which is different from the ID of the original document, to the document.

Also, an electronic tray has an electronic tray identifier (hereinafter also referred to as an "electronic tray ID") that allows the electronic tray to be identifiable in the exemplary embodiment.

The operation detecting module 112 is connected to the operation history generating module 120. The operation detecting module 112 detects a first operation, which is an operation of inputting a document to an electronic tray that stores a document, and a second operation, which is an operation of retrieving a document from the electronic tray.

The operation detecting module 112 detects an operation performed on a document with respect to an electronic tray, and obtains, from the document managing module 114, attributes to be included in operation history information. The attributes include an electronic tray ID, a document ID of the operated document, an operation name, and operator identification information (hereinafter also referred to as an operator ID) that allows the operator who has performed the operation to be uniquely identifiable in the exemplary embodiment. The types of operation include at least "input" and "retrieval".

The document managing module 114 manages a document input to an electronic tray. That is, the document managing module 114 stores a document input to an electronic tray, moves a document to a certain destination, and deletes the document from the electronic tray. If the operation detecting module 112 has detected an operation of inputting a document, the document managing module 114 stores the document in an electronic tray (a region allocated to the electronic tray in a memory). If the operation detecting module 112 has detected an operation of retrieving a document from an electronic tray, the document managing module 114 retrieves the document from the electronic tray (a region allocated to the electronic tray in the memory).

The document managing module 114 manages documents, which are distinguished from one another in an electronic tray, in association with users who have input the documents and attributes of the documents. Every time an operation of inputting a document is performed, the document managing module 114 manages a record in which a unique operation ID is associated with a user ID of a user who has performed the operation and attributes of the document. In this record, the attributes of the document may include a document ID, the date and time of the operation (the date and time when the operation was performed (any one of year, month, day, hour, minute, second, and fraction of second, or any combination thereof), or operation order information indicating an operation order as the date and time of operation). Such a record may be managed for each electronic tray. Alternatively, records for all electronic trays may be collectively managed, with each record being associated with an electronic tray ID. After a document corresponding to an operation ID has been retrieved from an electronic tray, the record thereof is deleted. Alternatively, a record may include an "in Tray" flag for identifying whether or not a document exists in the electronic tray. In this case, the "in Tray" flag is set to "true" upon a document being input, and is set to "false" upon the document being retrieved. An operation with respect to an electronic tray is performed in an exclusive manner, that is, only one user is allowed to perform a retrieval operation at one time. In a retrieval operation, if the record of a specified operation ID has already been deleted or if the "in Tray" flag indicates false, the retrieval operation fails to be performed.

The operation history generating module 120 is connected to the operation detecting module 112, the status definition table 130, and the operation history DB 140.

The operation history generating module 120 performs a history process (A) other than predetermined processes (B) and (C) related to cancellation history (described below). In the history process (A), the operation history generating module 120 generates history information regarding an operation detected by the operation detecting module 112, and stores the history information in the operation history DB 140.

Specifically, when a user performs an operation on a document with respect to an electronic tray, the operation detecting module 112 detects the operation and obtains an electronic tray ID, a document ID, a user ID, the date and time of operation, and an operation name. The operation history generating module 120 obtains a status corresponding to the operation from the status definition table 130, and generates operation history information including the status. Particularly, in an operation of retrieving a document from an electronic tray, the operation history generating module 120 obtains, from the operation history DB 140, a user ID of a user who has input the document to the electronic tray. If the obtained user ID matches a user ID of a user who is performing the operation of retrieving the document, the operation history generating module 120 performs any one of special processes B1 to B6 described below. On the other hand, in an operation of inputting a document, the operation history generating module 120 obtains, from the operation history DB 140, a user ID of a user who has retrieved the document from the electronic tray. If the obtained user ID matches a user ID of a user who is performing the operation of inputting the document, the operation history generating module 120 performs any one of special processes C1 to C6 described below.

The history process (A) is performed in the following cases:

(1-1) a case where an operation detected by the operation detecting module 112 is not the second operation;

(1-2) a case where an operation detected by the operation detecting module 112 is the second operation, and where there is no history information regarding the first operation as an already-performed operation;

(1-3) a case where an operation detected by the operation detecting module 112 is the second operation, and where there is history information regarding the first operation as an already-performed operation, but the document identification information included in the history information is different from the document identification information indicating the document on which the second operation has been performed; and (1-4) a case where an operation detected by the operation detecting module 112 is the second operation, and where there is history information regarding the first operation as an already-performed operation, but the operator identification information included in the history information is different from the operator identification information indicating the operator who has performed the second operation, or (2-1) a case where an operation detected by the operation detecting module 112 is not the first operation;

(2-2) a case where an operation detected by the operation detecting module 112 is the first operation, and where there is no history information regarding the second operation as an already-performed operation;

(2-3) a case where an operation detected by the operation detecting module 112 is the first operation, and where there is history information regarding the second operation as an already-performed operation, but the document identification information included in the history information is different from the document identification information indicating the document on which the first operation has been performed; and (2-4) a case where an operation detected by the operation detecting module 112 is the first operation, and where there is history information regarding the second operation as an already-performed operation, but the operator identification information included in the history information is different from the operator identification information indicating the operator who has performed the first operation, or a combination of the cases (1-1) and (2-1),
a combination of the cases (1-2) and (2-2),
a combination of the cases (1-3) and (2-3), or
a combination of the cases (1-4) and (2-4).

In a case where an operation detected by the operation detecting module 112 is the second operation, if history information indicates that the first operation has already been performed, if document identification information indicating the document on which the first operation has been performed matches document identification information indicating the document on which the second operation has been performed, and if operator identification information indicating the operator who has performed the first operation matches operator identification information indicating the operator who has performed the second operation, the operation history generating module 120 performs the predetermined process (B) related to cancellation history. This is a process performed in a case where an operator has retrieved, from an electronic tray, a document that had been input by the operator to the electronic tray. This corresponds to cancellation of the input of the document to the electronic tray.

Examples of the predetermined process (B) related to cancellation history include the followings:

(B1) not generating history information regarding the second operation detected by the operation detecting module 112;

(B2) adding status information representing cancellation to history information regarding the second operation detected by the operation detecting module 112;

(B3) not generating history information regarding the second operation detected by the operation detecting module 112 and deleting history information regarding the first operation corresponding to the second operation;

(B4) adding status information representing cancellation to history information regarding the second operation detected by the operation detecting module 112, and adding status information representing cancellation to history information regarding the first operation corresponding to the second operation;

(B5) adding status information representing cancellation to history information regarding the second operation by using a status definition table that stores definitions in which operations are associated with statuses (the status definition table is stored in the status definition table 130); and (B6) preparing a first status definition table that is applied in a case where an operator who has performed the first operation is different from an operator who has performed the second operation, and a second status definition table that is applied in a case where the operator who has performed the first operation matches the operator who has performed the second operation, and adding status information representing cancellation to history information regarding the second operation by using the second status definition table (the first and second status definition tables are stored in the status definition table 130, and the history information is stored in the operation history DB 140).

Note that, in the case of generating history information in the predetermined process (B) related to cancellation history, a process equivalent to the history process (A) is performed, but status information representing cancellation is added, as described above.

The operation history generating module 120 may use, instead of a condition that the operator identification information indicating the operator who has performed the second operation matches operator identification information in history information, a condition that a group to which the operator who has performed the second operation detected by the operation detecting module 112 belongs matches a group to which the operator who has performed the first operation in the history information belongs, by using a group definition table that stores operator identification information and group identification information in association with each other. The group identification information indicates a group to which the operator indicated by the operator identification information belongs. The details of the group definition table will be described below with reference to a group definition table 2800 illustrated in FIG. 28.

The operation history generating module 120 may use, instead of a condition that the operator identification information indicating the operator who has performed the second operation matches operator identification information in history information, a condition that an authority of the operator who has performed the second operation detected by the operation detecting module 112 matches an authority of the operator who has performed the first operation in the history information, by using an authority definition table that stores operator identification information and authority information in association with each other. The authority information indicates an authority of the operator indicated by the operator identification information. The details of the authority definition table will be described below with reference to an authority definition table 2900 illustrated in FIG. 29.

In a case where an operation detected by the operation detecting module 112 is the first operation, if history information indicates that the second operation has already been performed, if document identification information indicating the document on which the second operation has been performed matches document identification information indicating the document on which the first operation has been performed, and if operator identification information indicating the operator who has performed the second operation matches operator identification information indicating the operator who has performed the first operation, the operation history generating module 120 performs the predetermined process (C) related to cancellation history. This is a process performed in a case where an operator has input, to an electronic tray, a document that had been retrieved by the operator from the electronic tray. This corresponds to cancellation of the retrieval of the document from the electronic tray (refusal of reception).

Examples of the predetermined process (C) related to cancellation history include the followings:

(C1) not generating history information regarding the first operation detected by the operation detecting module 112;

(C2) adding status information representing cancellation to history information regarding the first operation detected by the operation detecting module 112;

(C3) not generating history information regarding the first operation detected by the operation detecting module 112 and deleting history information regarding the second operation corresponding to the first operation;

(C4) adding status information representing cancellation to history information regarding the first operation detected by the operation detecting module 112, and adding status information representing cancellation to history information regarding the second operation corresponding to the first operation;

(C5) adding status information representing cancellation to history information regarding the first operation by using a status definition table that stores definitions in which operations are associated with statuses (the status definition table is stored in the status definition table 130); and (C6) preparing a first status definition table that is applied in a case where an operator who has performed the first operation is different from an operator who has performed the second operation, and a second status definition table that is applied in a case where the operator who has performed the first operation matches the operator who has performed the second operation, and adding status information representing cancellation to history information regarding the first operation by using the second status definition table (the first and second status definition tables are stored in the status definition table 130, and the history information is stored in the operation history DB 140).

Note that, in the case of generating history information in the predetermined process (C) related to cancellation history, a process equivalent to the history process (A) is performed, but status information representing cancellation is added, as described above.

The operation history generating module 120 may use, instead of a condition that the operator identification information indicating the operator who has performed the first operation matches operator identification information in history information, a condition that a group to which the operator who has performed the first operation detected by the operation detecting module 112 belongs matches a group to which the operator who has performed the second operation in the history information belongs, by using a group definition table that stores operator identification information and group identification information in association with each other. The group identification information indicates a group to which the operator indicated by the operator identification information belongs. The details of the group definition table will be described below with reference to the group definition table 2800 illustrated in FIG. 28.

The operation history generating module 120 may use, instead of a condition that the operator identification information indicating the operator who has performed the first operation matches operator identification information in history information, a condition that an authority of the operator who has performed the first operation detected by the operation detecting module 112 matches an authority of the operator who has performed the second operation in the history information, by using an authority definition table that stores operator identification information and authority information in association with each other. The authority information indicates an authority of the operator indicated by the operator identification information. The details of the authority definition table will be described below with reference to the authority definition table 2900 illustrated in FIG. 29.

In a case where an operation detected by the operation detecting module 112 is the second operation, if history information indicates that the first operation has already been performed, and if the document identification information and the operator identification information included in the history information match the document identification information indicating the document on which the second operation has been performed and the operator identification information indicating the operator who has performed the second operation, the operation history generating module 120 may perform the predetermined process (B) related to cancellation history. In a case where an operation detected by the operation detecting module 112 is the first operation, if history information indicates that the second operation has already been performed, and if the document identification information and the operator identification information included in the history information match the document identification information indicating the document on which the first operation has been performed and the operator identification information indicating the operator who has performed the first operation, the operation history generating module 120 may perform the predetermined process (C) related to cancellation history. Examples of the predetermined process (B) related to cancellation history include the above-described processes (B1) to (B6). Examples of the predetermined process (C) related to cancellation history include the above-described processes (C1) to (C6).

The status definition table 130 is connected to the operation history generating module 120. The status definition table 130 stores status definition tables, as described above.

The status definition table 130 stores status definition tables for respective electronic trays. Each status definition table defines a status corresponding to each operation performed on a document with respect to the electronic tray. The content of the status definition table is predetermined. Operations in the status definition table include at least "input" or "retrieval". The status definition table for each electronic tray may be managed as a single status definition table by assigning a tray ID thereto. That is, a tray ID field is added to the status definition table, which includes status definition tables for plural electronic trays. In this case, each electronic tray is identified with reference to the tray ID field.

The details will be described with reference to a status definition table 2400 (for reception tray) and a status definition table 2500 (for reception tray) illustrated in FIGS. 24 and 25.

The operation history DB 140 is connected to the operation history generating module 120 and the operation history display module 150. Specifically, the operation history DB 140 manages a document ID, a tray ID, a status, the date and time of an operation, etc. in association with one another. The details will be described below with reference to tray history data 600 illustrated in FIG. 6 and so forth.

The operation history display module 150 is connected to the operation history DB 140. The operation history display module 150 displays, on the basis of history information stored in the operation history DB 140, jobs that have been performed on a document in a workflow including plural jobs. Also, the operation history display module 150 displays a list of document IDs, tray IDs, and statuses in the form of a table or the like. Furthermore, searching or filtering may be performed by using a document ID, a tray ID, and a status.

Figure 2:
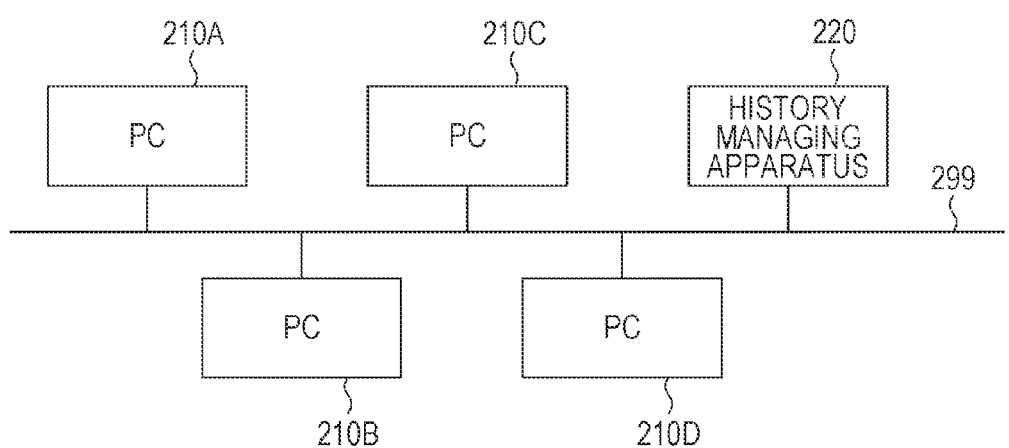
FIG. 2 is a diagram illustrating an example of a system configuration according to the exemplary embodiment.

FIG. 2 is a diagram illustrating an example of a system configuration according to the exemplary embodiment.

Personal computers (PCs) 210A to 210D and a history managing apparatus 220 are connected to one another via a communication line 299. Each of the PCs 210A to 210D includes the electronic tray processing module 110, the operation history generating module 120, the status definition table 130, and the operation history display module 150. The history managing apparatus 220 includes the operation history DB 140. Individual users who operate the PCs 210A to 210D transmit and receive a document via electronic trays. For example, the users transmit and receive a document in a workflow.

A typical workflow will be described.

For example, assume a work that progresses by passing around a form expressed by a document. Information described on the form includes a deadline and cost, a condition of each case such as the type of case, a record of progress indicating whether or not approval has been made or a process has been performed, the record being added in each process of the workflow, and information indicating the department or person in charge of the case. The processes included in the workflow, the route along which the form is passed around, and the details of the processes may vary depending on circumstances, such as an amount of money or the type of case. Persons in charge who process the form in individual processes of the workflow do not always recognize the overview of the workflow. That is, they do not always understand the route along which the form is passed around and how the form is passed around and is processed. In such a case, in order to enable a department that has drafted the form or a department involved in the workflow to know where the form is now, a person in charge in each process records the identifier of the form (in the case of an approval document, for example, an approval number) and the status of the form (for example, receipt, process completed, pending, decided, etc.) on an electronic register, which is shared among users involved in the workflow using a file shared thereby. In each process, a person in charge records the identifier of the form (in the case of an approval document, for example, an approval number) and the status of the form on an electronic register.

The exemplary embodiment is applicable to such a workflow. For example, an electronic tray is associated with each process of the workflow. In the exemplary embodiment, a form is transmitted and received using electronic trays in individual processes, and the status of the form which changes every time the form is transmitted and received in the individual processes in the workflow is managed. Accordingly, the users are capable of recognizing the progress of the work by seeing a screen display presenting the managed status of the form.

Figure 3:
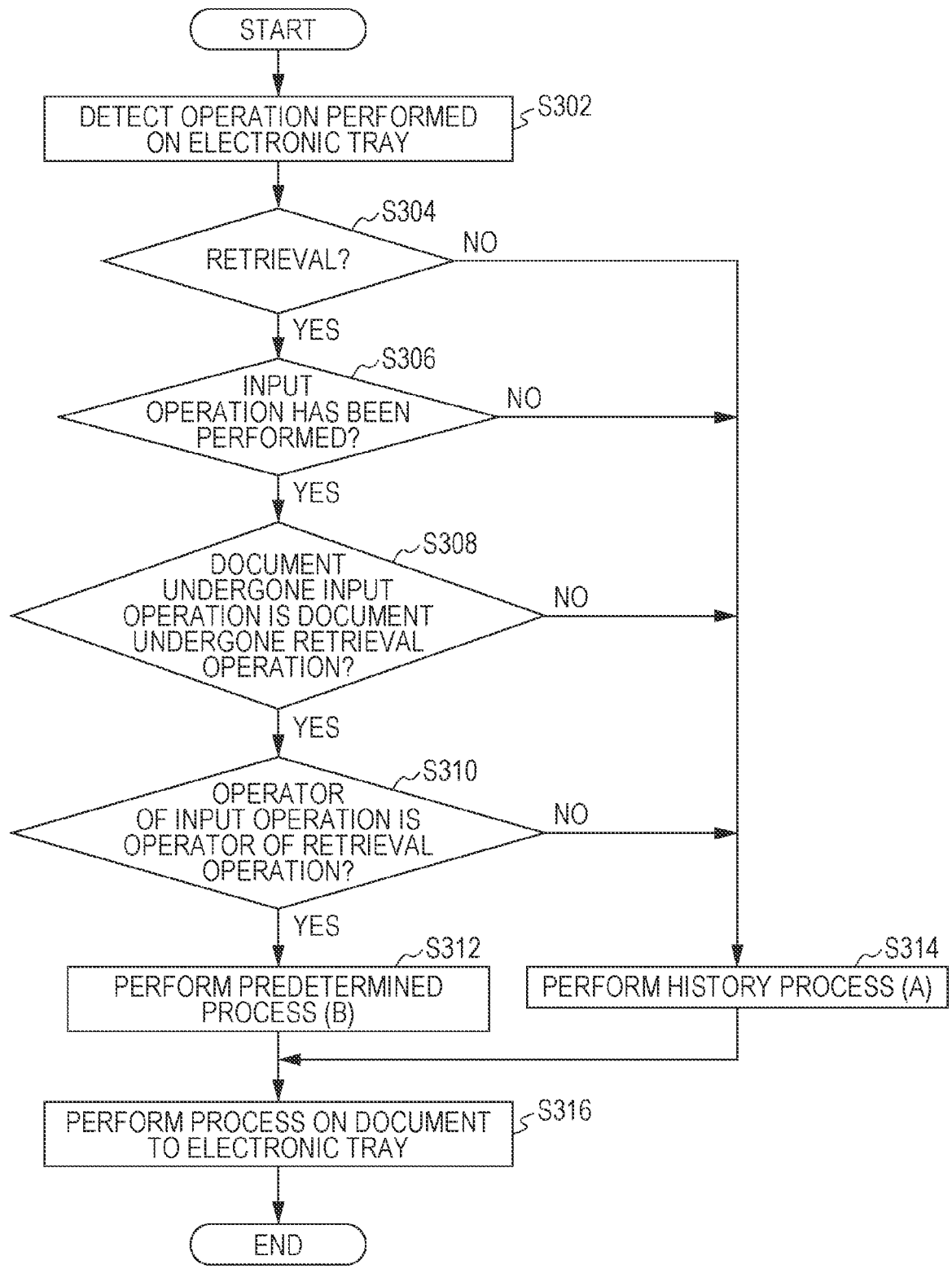
FIG. 3 is a flowchart illustrating an example of a process according to the exemplary embodiment.
Figure 10A:
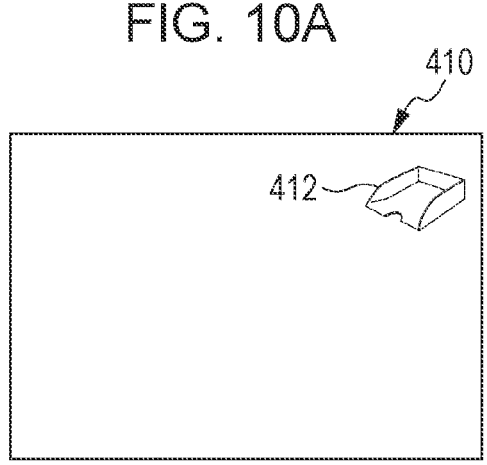
FIGS. 10A and 10B are diagrams illustrating an example of a process according to the exemplary embodiment.
Figure 10B:
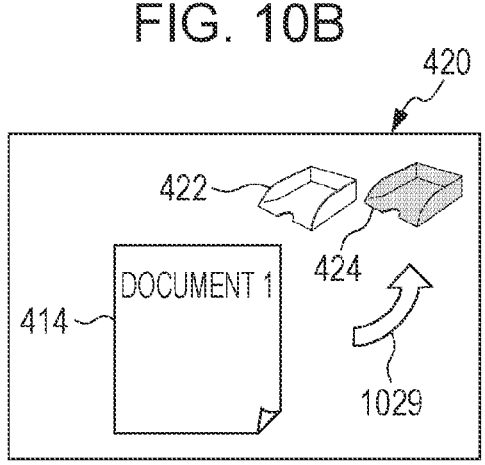

FIG. 3 is a flowchart illustrating an example of a process according to the exemplary embodiment. In this process, the history process (A) or the predetermined process (B) is performed.

In step S302, the operation detecting module 112 detects an operation performed on an electronic tray.

In step S304, the operation history generating module 120 determines whether or not the operation is retrieval. If the operation is retrieval, the process proceeds to step S306. Otherwise, the process proceeds to step S314.

In step S306, the operation history generating module 120 determines whether or not history information indicates that an input operation has been performed. If history information indicates that an input operation has been performed, the process proceeds to step S308. Otherwise, the process proceeds to step S314.

In step S308, the operation history generating module 120 determines whether or not the document that has undergone the input operation is the document that has undergone the retrieval operation. If both the documents match, the process proceeds to step S310. Otherwise, the process proceeds to step S314.

In step S310, the operation history generating module 120 determines whether or not the operator who has performed the input operation is the operator who has performed the retrieval operation. If both the operators match, the process proceeds to step S312. Otherwise, the process proceeds to step S314.

In step S312, the operation history generating module 120 performs the predetermined process (B).

In step S314, the operation history generating module 120 performs the history process (A).

In step S316, the document managing module 114 performs a process on the document with respect to the electronic tray in accordance with the operation.

Steps S306, S308, and S310 may be performed in any order, or may be conditions of three ANDs.

Step S316 may be performed at any timing after step S302.

Typical functions of electronic trays (history process (A)) will be described with reference to FIGS. 4A to 14. Description will be given of an example in which a document is transmitted and received between a user 1 and a user 2. Alternatively, a document may be transmitted and received using the same electronic tray among three or more users. In this case, the user who first retrieves the document from the electronic tray enables the document to be processed. The other users are capable of retrieving the document from the electronic tray only after the document has been input to the electronic tray again.

FIGS. 4A and 4B are diagrams illustrating an example of a process according to the exemplary embodiment. A screen 410 (user 1) illustrated in FIG. 4A is displayed on, for example, a display of the PC 210A used by the user 1. A reception tray 412, which is an electronic tray, is displayed on the screen 410. A screen 420 (user 2) illustrated in FIG. 4B is displayed on, for example, a display of the PC 210B used by the user 2. A reception tray 422 and a decision tray 424, which are electronic trays, are displayed on the screen 420. The reception tray 412 and the reception tray 422 are the same reception trays. That is, the reception tray 412 and the reception tray 422 have the same electronic tray ID. For example, the user 1 transmits an e-mail to the user 2 by attaching the reception tray 412 to the e-mail, and thereby the PC 210A and the PC 210B share the same electronic tray.

Here, the user 1 performs, on the screen 410, an operation 419 of inputting a document 1 (414) on the desktop to the reception tray 412. The operation detecting module 112 detects that the document 1 (414) has been input to the reception tray 412 (input operation 419).

FIGS. 5A and 5B are diagrams illustrating an example of a process according to the exemplary embodiment. FIG. 5A illustrates a state where the document 1 (414) has been input to the reception tray 412. That is, the document 1 (414) has been stored in the reception tray 412, and has been deleted from the desktop. Alternatively, the document 1 (414) may be copied to the reception tray 412. In this case, the document 1 (414) remains on the desktop.

Upon the input operation 419 being performed, the screen 420 shows that the document 1 (414) is stored in the reception tray 422, as illustrated in FIG. 5B. For example, the electronic tray processing module 110 in the PC 210B searches the storage region allocated to the reception tray 422 (reception tray 412), and, if the document is stored therein, display is performed in the manner illustrated in FIG. 5B.

Additionally, the number of documents stored in each electronic tray may be displayed in a number-of-documents display region 413 and a number-of-documents display region 423, so that a user may recognize the number of documents in each electronic tray. This process is performed by the electronic tray processing module 110.

FIG. 6 is a diagram illustrating an example of the data structure of tray history data 600. FIG. 6 illustrates the tray history data 600 stored in the operation history DB 140 in the state illustrated in FIGS. 5A and 5B. The tray history data 600 is generated by the operation history generating module 120. The operation detecting module 112 detects the input operation 419, and obtains, from the document managing module 114, attributes to be added to operation history information. The operation history generating module 120 generates the tray history data 600 by using the attributes and date/time information indicating the date and time when the operation was performed.

The tray history data 600 has a document name (ID) field 610, a user name (ID) field 620, a date and time field 630, a tray name (ID) field 640, an operation name field 650, and a status field 660. The document name (ID) field 610 stores the document ID of the document 1 (414). The user name (ID) field 620 stores the ID of the operator who has performed the input operation 419. The date and time field 630 stores the date and time when the input operation 419 was performed. The tray name (ID) field 640 stores the electronic tray ID of the reception tray 412 (the reception tray 422). The operation name field 650 stores the input operation 419. The status field 660 stores the status corresponding to the input operation 419 in the reception tray 412. Here, the status is obtained by the operation history generating module 120 referring to the status definition table 2400 illustrated in FIG. 24 associated with the reception tray 412 (reception tray 422) in the status definition table 130. That is, the status definition table 2400 is associated with the reception tray 412 (reception tray 422). If an operation has been performed on the reception tray 412 (reception tray 422), the status corresponding to the operation may be extracted. Specifically, the status corresponding to the input operation 419 is "submitted".

FIGS. 7A and 7B are diagrams illustrating an example of a process according to the exemplary embodiment. As illustrated in FIG. 7B, the user 2 performs a retrieval operation 729 of retrieving the document 1 (414) from the reception tray 422.

FIG. 8B illustrates a state where the retrieval operation 729 has been performed. Here, the document 1 (414) has been retrieved from the reception tray 422. Thus, as illustrated in FIG. 8B, the document 1 (414) has disappeared from the reception tray 422. Also, as illustrated in FIG. 8A, the document 1 (414) has disappeared from the reception tray 412. The retrieved document 1 (414) is displayed on the desktop.

Here, the operation detecting module 112 detects the retrieval operation 729. Thus, the tray history data 600 illustrated in FIG. 6 is changed to the tray history data 600 illustrated in FIG. 9 by the operation history generating module 120. The tray history data 600 illustrated in FIG. 9 has another line of data with respect to the tray history data 600 illustrated in FIG. 6. That is, the second line of the tray history data 600 shows that the document 1 was retrieved from the reception tray 422 (reception tray 412) by the user 2 at 10:30 on 12.1.2011, and that the status is "received". The status "received" is stored in the status field 660 as a result of extracting "received", which corresponds to "retrieval", with reference to the status definition table 2400 associated with the reception tray 422 (reception tray 412), as described above.

Subsequently, the user 2 performs a process on the document 1 (414) retrieved from the reception tray 422 (for example, puts a signature to the document 1 (414)), and performs an input operation 1029 on the document 1 (414) with respect to the decision tray 424. At this time, the input operation 1029 is detected by the operation detecting module 112.

Figure 11A:
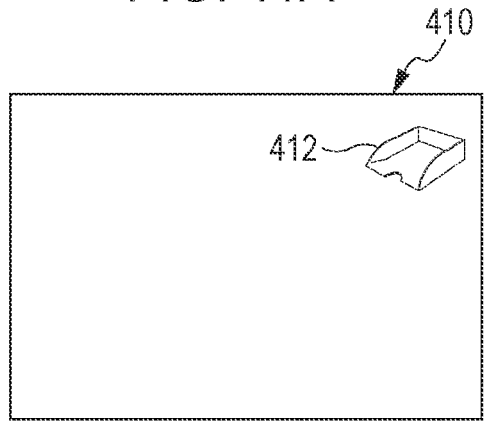
FIGS. 11A and 11B are diagrams illustrating an example of a process according to the exemplary embodiment.
Figure 11B:
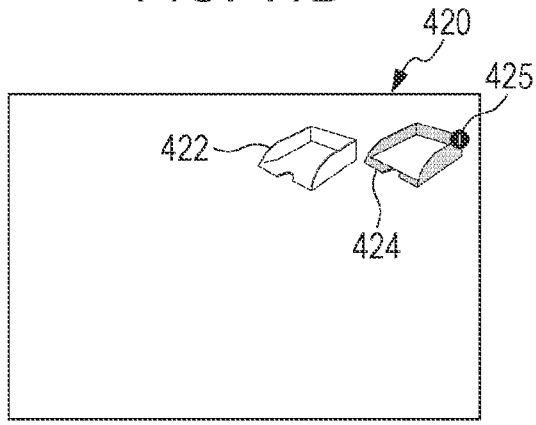

After the electronic tray processing module 110 has processed the input operation 1029, the screen 420 shows that the document 1 (414) is stored in the decision tray 424, as illustrated in FIG. 11B. Also, a number-of-documents display region 425 showing that one document is stored in the decision tray 424 is displayed.

Here, the operation detecting module 112 detects the input operation 1029. Accordingly, the tray history data 600 illustrated in FIG. 9 is changed by the operation history generating module 120 to the tray history data 600 illustrated in FIG. 12. The tray history data 600 illustrated in FIG. 12 has another line of data with respect to the tray history data 600 illustrated in FIG. 9. That is, the third line of the tray history data 600 is generated, which shows that the document 1 was input to the decision tray 424 by the user 2 at 11:30 on 12.1.2011, and that the status is "decided". The status "decided" is stored in the status field 660 as a result of extracting "decided", which corresponds to "input", with reference to the status definition table associated with the decision tray 424 in the status definition table 130, in a manner similar to that described above. Alternatively, the status "decision process started" may be displayed after the user 2 has retrieved the document 1 from the reception tray 422 in order to start a decision process, and the status "decision process completed" may be displayed after the user 2 has input the document 1 that has undergone the decision process to the decision tray 424. Accordingly, the user 1 who has submitted the document 1 is capable of grasping that the decision process has been started and completed. The definition in a status definition table may be appropriately determined in accordance with the range within which the status is to be grasped.

FIG. 13 is a diagram illustrating an example of a status display screen 1300. The status display screen 1300 is an example in which the operation history display module 150 displays history information stored in the operation history DB 140. The status display screen 1300 has a document name (ID) field 1310, a user name (ID) field 1320, a date and time field 1330, a tray name (ID) field 1340, an operation name field 1350, and a status field 1360. The document name (ID) field 1310, the user name (ID) field 1320, the date and time field 1330, the tray name (ID) field 1340, the operation name field 1350, and the status field 1360 correspond to the document name (ID) field 610, the user name (ID) field 620, the date and time field 630, the tray name (ID) field 640, the operation name field 650, and the status field 660 in the tray history data 600, respectively, and present the last line (latest history information) of the tray history data 600.

When a detailed information display button 1312 is selected by the user, the operation history display module 150 displays the whole history information related to the document 1. FIG. 14 is a diagram illustrating an example of a status display screen 1400. The status display screen 1400 has a document name (ID) field 1410, a user name (ID) field 1420, a date and time field 1430, a tray name (ID) field 1440, an operation name field 1450, and a status field 1460. These are equivalent to those of the status display screen 1300, correspond to the document name (ID) field 610, the user name (ID) field 620, the date and time field 630, the tray name (ID) field 640, the operation name field 650, and the status field 660 in the tray history data 600, respectively, and present the history information related to the document 1 in the tray history data 600.

When a detailed information hiding button 1412 is selected by the user, the operation history display module 150 displays the latest history information in the whole history information related to the document 1 (the status display screen 1300 illustrated in FIG. 13).

Hereinafter, description will be given of a process that is performed in a case where an input operation and a retrieval operation are performed on the same document by the same user with respect to an electronic tray (the predetermined process (B) related to cancellation history) with reference to FIGS. 15A to 29.

FIGS. 15A and 15B are diagrams illustrating an example of a process according to the exemplary embodiment. The state illustrated in FIGS. 15A and 15B is continued from the state illustrated in FIGS. 11A and 11B. In the following description, a process for the decision tray 424 is not necessary, and thus there is no document in the decision tray 424, and the number-of-documents display region 425 is not displayed. The example illustrated in FIGS. 15A and 15B is equivalent to the example illustrated in FIGS. 4A and 4B. However, in the example illustrated in FIGS. 15A and 15B, an input operation 1519 is performed on a document 2 (1514), not on the document 1 (414).

Upon the input operation 1519 being performed, the state changes to the state illustrated in FIGS. 16A and 16B. The example illustrated in FIGS. 16A and 16B is equivalent to the example illustrated in FIGS. 5A and 5B. However, in the example illustrated in FIGS. 16A and 16B, the document 2 (1514) is stored in the reception tray 412.

Here, the operation detecting module 112 detects the input operation 1519. Accordingly, the tray history data 600 illustrated in FIG. 12 is changed by the operation history generating module 120 to the tray history data 600 illustrated in FIG. 17. The tray history data 600 illustrated in FIG. 17 has another line of data with respect to the tray history data 600 illustrated in FIG. 12. That is, the fourth line of the tray history data 600 is generated, which shows that the document 2 was input to the reception tray 412 by the user 1 at 10:00 on 12.2.2011, and that the status is "submitted". The status "submitted" is stored in the status field 660 as a result of extracting "submitted", which corresponds to "input", with reference to the status definition table 2400 associated with the reception tray 412 in the status definition table 130, in a manner similar to that described above.

FIGS. 18A and 18B are diagrams illustrating an example of a process according to the exemplary embodiment. As illustrated in FIG. 18A, the user 1 performs a retrieval operation 1829 on the document 2 that has been input to the reception tray 412. This is performed in the following case, for example. The user 1 notices that the document 2 is incomplete after he/she has input the document 2 to the reception tray 412, and retrieves the document 2 from the reception tray 412 to make a correction. That is, the user 1, who has performed the input operation 1519 on the reception tray 412, performs the retrieval operation 1829 on the reception tray 412, so as to retrieve the document 2 that has been input before.

FIG. 19A illustrates the state where the retrieval operation 1829 has been performed. Here, the document 2 has been retrieved from the reception tray 412, and thus the document 2 has disappeared from the reception tray 412, as illustrated in FIG. 19A, and the retrieved document 2 (1514) is displayed on the desktop. Also, as illustrated in FIG. 19B, the document 2 has disappeared from the reception tray 422.

Here, the operation detecting module 112 detects the retrieval operation 1829. Accordingly, the tray history data 600 illustrated in FIG. 17 is changed by the operation history generating module 120 to the tray history data 600 illustrated in FIG. 20. This is the tray history data 600 obtained through the above-described process (B3). That is, history information regarding the retrieval operation 1829 is not generated, and the history information corresponding to the retrieval operation 1829 (the fourth line of the tray history data 600 illustrated in FIG. 17) is deleted. The history information corresponding to the retrieval operation 1829 may be history information satisfying conditions: history information regarding an input operation; history information indicating that an input operation has been performed on the document 2, which is a target of the retrieval operation 1829; and history information indicating that an input operation has been performed by the operator who has performed the retrieval operation 1829, and the history information satisfying the conditions is deleted. The conditions may further include that the history information is the history information for the reception tray 412 (reception tray 422).

The operation history generating module 120 may not generate history information regarding the retrieval operation 1829, so as to leave the tray history data 600 illustrated in FIG. 17 unchanged (process (B1)).

Alternatively, the operation history generating module 120 may change the tray history data 600 illustrated in FIG. 17 to the tray history data 600 illustrated in FIG. 21. The tray history data 600 illustrated in FIG. 21 has another line with respect to the tray history data 600 illustrated in FIG. 17. The tray history data 600 illustrated in FIG. 21 may be obtained by performing any one of the above-described processes (B2), (B5), and (B6). The operation history generating module 120 generates history information regarding the retrieval operation 1829 by performing a process equivalent to the process (A). Specifically, the operation history generating module 120 generates the fifth line of the tray history data 600 illustrated in FIG. 21, which shows that the document 2 was retrieved from the reception tray 412 by the user 1 at 10:10 on 12.2.2011. Regarding the status "submission canceled", in the process (B2), the operation detecting module 112 stores "submission canceled" in the status field 660 if there is history information satisfying the above-described conditions. In the process (B5), the operation detecting module 112 stores "submission canceled" in the status field 660 by using a status definition table in which operations are associated with statuses (the status definition table 2400 illustrated in FIG. 24 in which the operation name (ID) field 2410 stores the name of operation (operation including the above-described conditions) and the status field 2420 corresponding thereto stores "submission canceled"). In the process (B6), the operation detecting module 112 prepares the first status definition table, which is applied in a case where the operator who has performed the first operation is different from the operator who has performed the second operation (the status definition table 2400 illustrated in FIG. 24), and the second status definition table, which is applied in a case where the operator who has performed the first operation matches the operator who has performed the second operation (the status definition table 2500 illustrated in FIG. 25), and stores "submission canceled" in the status field 660 on the basis of the second status definition table.

If the above-described process (B4) has been performed, the operation history generating module 120 rewrites the fourth line of the tray history data 600 illustrated in FIG. 21 (history information satisfying the above-described conditions) in the status field 660 to "submission canceled". Also, the operation history generating module 120 generates the fifth line of the tray history data 600 in a process equivalent to the process (B2) of the operation history generating module 120.

FIG. 22 is a diagram illustrating an example of a status display screen 2200. The status display screen 2200 is an example in which the operation history display module 150 displays the history information stored in the operation history DB 140. The status display screen 2200 has a document name (ID) field 2210, a user name (ID) field 2220, a date and time field 2230, a tray name (ID) field 2240, an operation name field 2250, and a status field 2260. The document name (ID) field 2210, the user name (ID) field 2220, the date and time field 2230, the tray name (ID) field 2240, the operation name field 2250, and the status field 2260 correspond to the document name (ID) field 610, the user name (ID) field 620, the date and time field 630, the tray name (ID) field 640, the operation name field 650, and the status field 660 in the tray history data 600 illustrated in FIG. 21, respectively, and present the last line for each document in the tray history data 600 (the latest history information, i.e., the third line of the tray history data 600 illustrated in FIG. 21 for the document 1, and the fifth line of the tray history data 600 illustrated in FIG. 21 for the document 2).

When a detailed information display button 2212 is selected by the user, the operation history display module 150 displays the whole history information related to the document 2. FIG. 23 is a diagram illustrating an example of a status display screen 2300. The status display screen 2300 has a document name (ID) field 2310, a user name (ID) field 2320, a date and time field 2330, a tray name (ID) field 2340, an operation name field 2350, and a status field 2360. These are equivalent to those of the status display screen 2200, correspond to the document name (ID) field 610, the user name (ID) field 620, the date and time field 630, the tray name (ID) field 640, the operation name field 650, and the status field 660 in the tray history data 600, respectively, and present the history information related to the document in the tray history data 600. The whole history information related to the document 2 is displayed in the second line and the subsequent line.

If a detailed information hiding button 2312 is selected by the user, the operation history display module 150 displays the latest history information in the whole history information related to the document 2 (the status display screen 2200 illustrated in FIG. 22).

Now, description will be given of the status definition table 2400 used in the examples illustrated in FIGS. 4A to 14 and FIGS. 15A to 29. FIG. 24 is a diagram illustrating an example of the data structure of the status definition table 2400. The status definition table 2400 has the operation name (ID) field 2410 and the status field 2420. The operation name (ID) field 2410 stores operation names. The status field 2420 stores status information. A status definition table is provided for each tray. That is, status definition tables are prepared for respective tray IDs. Specifically, there are provided a status definition table for the reception tray 412 (reception tray 422), that is, the status definition table 2400, and a status definition table for the decision tray 424. The status definition table 2400 is stored in the status definition table 130. The operation history generating module 120 extracts status information corresponding to an operation by using the status definition table for the target electronic tray. For example, if an input operation is performed on the electronic tray, status information "submitted" is extracted. If a retrieval operation is performed on the electronic tray, status information "received" is extracted.

As described above, in the operation name (ID) field 2410 of the status definition table 2400, the name of an operation with a condition may be stored as well as the name of an operation. The condition may be, for example, a retrieval operation with history information regarding an input operation, the retrieval operation and the input operation have been performed on the same document, and the operators of the two operations are the same.

The operation history generating module 120 may use, instead of the status definition table 2400, the status definition table 2500 as a status definition table corresponding to the electronic tray. The status definition table 2400 or 2500 is used to perform the above-described process (B6). That is, the status definition table 2400 is applied in a case where the operator who has performed the first operation is different from the operator who has performed the second operation. The status definition table 2500 is applied in a case where the operator who has performed the first operation matches the operator who has performed the second operation. FIG. 25 is a diagram illustrating an example of the data structure of the status definition table 2500. The status definition table 2500 has an operation name (ID) field 2510 and a status field 2520. The data structure thereof is equivalent to that of the status definition table 2400. The status definition table 2500 is stored in the status definition table 130.

The operation history generating module 120 applies the status definition table 2400 in a case where the operator who has performed the first operation on an electronic tray is different from the operator who has performed the second operation on the electronic tray, and applies the status definition table 2500 in a case where the operator who has performed the first operation on an electronic tray matches the operator who has performed the second operation on the electronic tray. For example, if an input operation is performed on the electronic tray, the status is "reception canceled" (process (B6)). If a retrieval operation is performed on the electronic tray, the status is "submission canceled" (process (C6)).

An example of metadata of the operation history information corresponding to the tray history data 600 illustrated in FIG. 21 is operation history data 2600. FIG. 26 is a diagram illustrating an example of the data structure of the operation history data 2600. The operation history data 2600 has a document ID field 2610, a user ID field 2620, a tray ID field 2630, an operation name field 2640, and a date and time field 2650. The operation history generating module 120 searches the status definition table for the status, and adds the operation history data 2600 and the status to the operation history DB 140.

Alternatively, the status may be included in the operation history data when generating operation history information, as in operation history data 2700. FIG. 27 is a diagram illustrating an example of the data structure of the operation history data 2700. The operation history data 2700 has a document ID field 2710, a user ID field 2720, a tray ID field 2730, an operation name field 2740, a date and time field 2750, and a status field 2760. Compared to the operation history data 2600, the operation history data 2700 further has the status field 2760. The operation history generating module 120 adds the operation history data 2700 to the operation history DB 140.

The operation history generating module 120 may use, instead of a condition that the operator ID of the operator who has performed the second operation matches an operator ID stored in the operation history DB 140, a condition that a group to which the operator who has performed the second operation detected by the operation detecting module 112 belongs matches a group to which the operator who has performed the first operation in the operation history DB 140 belongs, by using the group definition table 2800 (the condition of the process (B)). Also, the operation history generating module 120 may use, instead of a condition that the operator ID of the operator who has performed the first operation matches an operator ID stored in the operation history DB 140, a condition that a group to which the operator who has performed the first operation detected by the operation detecting module 112 belongs matches a group to which the operator who has performed the second operation in the operation history DB 140 belongs, by using the group definition table 2800 (the condition of the process (C)).

FIG. 28 is a diagram illustrating an example of the data structure of the group definition table 2800. The group definition table 2800 stores operator IDs and group IDs in association with each other. The group IDs are information indicating the groups to which the operators indicated by the operator IDs belong (information with which the groups are uniquely identifiable in the exemplary embodiment). Specifically, the group definition table 2800 has a user name (ID) field 2810 and a group name (ID) field 2820.

Also, the operation history generating module 120 may use, instead of a condition that the operator ID of the operator who has performed the second operation matches an operator ID stored in the operation history DB 140, a condition that an authority of the operator who has performed the second operation detected by the operation detecting module 112 matches an authority of the operator who has performed the first operation in the operation history DB 140, by using the authority definition table 2900 (the condition of the process (B)). Also, the operation history generating module 120 may use, instead of a condition that the operator ID of the operator who has performed the first operation matches an operator ID stored in the operation history DB 140, a condition that an authority of the operator who has performed the first operation detected by the operation detecting module 112 matches an authority of the operator who has performed the second operation in the operation history DB 140, by using the authority definition table 2900 (the condition of the process (C)).

FIG. 29 is a diagram illustrating an example of the data structure of the authority definition table 2900. The authority definition table 2900 stores operator IDs and authority information in association with each other, the authority information indicating authority of an operator indicated by each operation ID. Specifically, the authority definition table 2900 has a user name (ID) field 2910 and an authority field 2920. The types of authority stored in the authority field 2920 include a person in charge and a section manager, as illustrated in FIG. 29. The types of authority may also include a general manager, a director in charge, and a president. Other than such titles, the types of authority may be a person in charge of X process, a person capable of deciding Y, or the like indicating a function.

Figure 30:
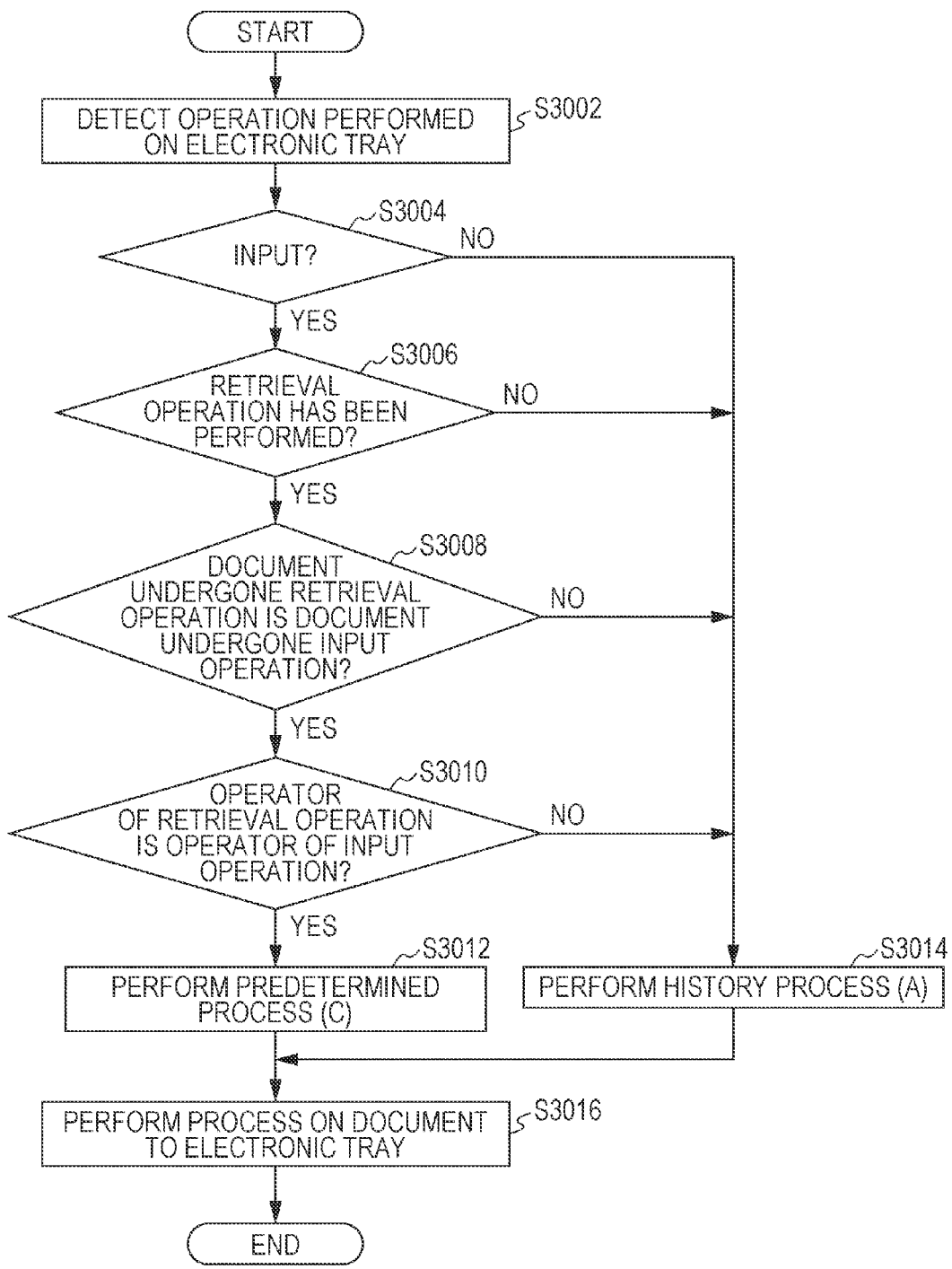
FIG. 30 is a flowchart illustrating an example of a process according to the exemplary embodiment.

FIG. 30 is a flowchart illustrating an example of a process according to the exemplary embodiment. In this process, the history process (A) or the predetermined process (C) is performed.

In step S3002, the operation detecting module 112 detects an operation performed on an electronic tray.

In step S3004, the operation history generating module 120 determines whether or not the operation is input. If the operation is input, the process proceeds to step S3006. Otherwise, the process proceeds to step S3014.

In step S3006, the operation history generating module 120 determines whether or not history information indicates that a retrieval operation has been performed. If history information indicates that a retrieval operation has been performed, the process proceeds to step S3008. Otherwise, the process proceeds to step S3014.

In step S3008, the operation history generating module 120 determines whether or not the document that has undergone the retrieval operation is the document that has undergone the input operation. If both the documents match, the process proceeds to step S3010. Otherwise, the process proceeds to step S3014.

In step S3010, the operation history generating module 120 determines whether or not the operator who has performed the retrieval operation is the operator who has performed the input operation. If both the operators match, the process proceeds to step S3012. Otherwise, the process proceeds to step S3014.

In step S3012, the operation history generating module 120 performs the predetermined process (C).

In step S3014, the operation history generating module 120 performs the history process (A).

In step S3016, the document managing module 114 performs a process on the document with respect to the electronic tray in accordance with the operation.

Steps S3006, S3008, and S3010 may be performed in any order, or may be conditions of three ANDS.

Step S3016 may be performed at any timing after step S3002.

The process described here is equivalent to the process (B) described above with reference to FIGS. 15A to 29 except that an input operation is replaced with a retrieval operation, and a retrieval operation is replaced with an input operation.

Figure 31:
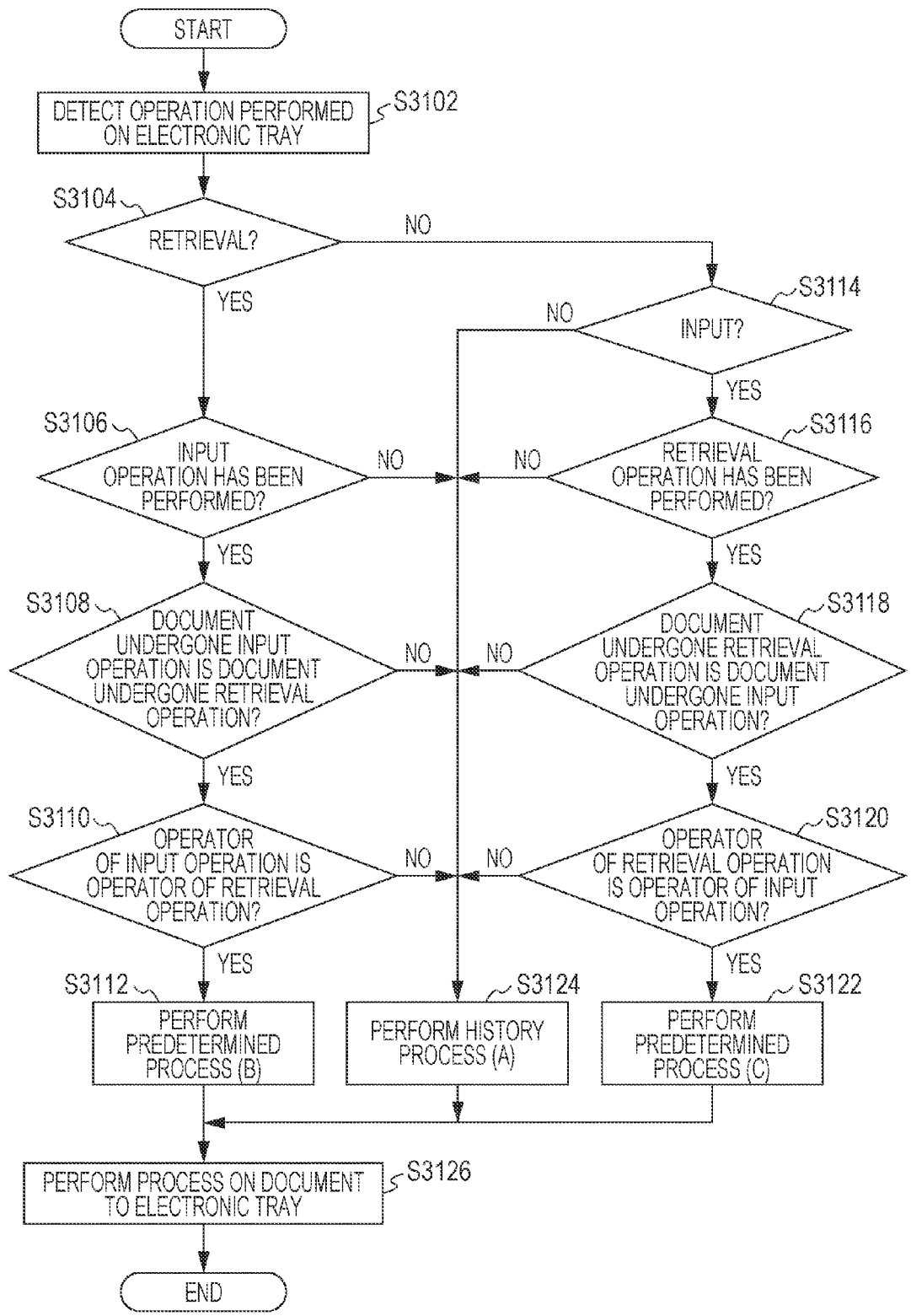
FIG. 31 is a flowchart illustrating an example of a process according to the exemplary embodiment.

FIG. 31 is a flowchart illustrating an example of a process according to the exemplary embodiment. In this process, the history process (A), the predetermined process (B), or the predetermined process (C) is performed.

In step S3102, the operation detecting module 112 detects an operation performed on an electronic tray.

In step S3104, the operation history generating module 120 determines whether or not the operation is retrieval. If the operation is retrieval, the process proceeds to step S3106. Otherwise, the process proceeds to step S3114.

In step S3106, the operation history generating module 120 determines whether or not history information indicates that an input operation has been performed. If history information indicates that an input operation has been performed, the process proceeds to step S3108. Otherwise, the process proceeds to step S3124.

In step S3108, the operation history generating module 120 determines whether or not the document that has undergone the input operation is the document that has undergone the retrieval operation. If both the documents match, the process proceeds to step S3110. Otherwise, the process proceeds to step S3124.

In step S3110, the operation history generating module 120 determines whether or not the operator who has performed the input operation is the operator who has performed the retrieval operation. If both the operators match, the process proceeds to step S3112. Otherwise, the process proceeds to step S3124.

In step S3112, the operation history generating module 120 performs the predetermined process (B).

In step S3114, the operation history generating module 120 determines whether or not the operation is input. If the operation is input, the process proceeds to step S3116. Otherwise, the process proceeds to step S3124.

In step S3116, the operation history generating module 120 determines whether or not history information indicates that a retrieval operation has been performed. If history information indicates that a retrieval operation has been performed, the process proceeds to step S3118. Otherwise, the process proceeds to step S3124.

In step S3118, the operation history generating module 120 determines whether or not the document that has undergone the retrieval operation is the document that has undergone the input operation. If both the documents match, the process proceeds to step S3120. Otherwise, the process proceeds to step S3124.

In step S3120, the operation history generating module 120 determines whether or not the operator who has performed the retrieval operation is the operator who has performed the input operation. If both the operators match, the process proceeds to step S3122. Otherwise, the process proceeds to step S3124.

In step S3122, the operation history generating module 120 performs the predetermined process (C).

In step S3124, the operation history generating module 120 performs the history process (A).

In step S3126, the document managing module 114 performs a process on the document with respect to the electronic tray in accordance with the operation.

Steps S3106, S3108, and S3110 may be performed in any order, or may be conditions of three ANDs. Steps S3116, S3118, and S3120 may be performed in any order, or may be conditions of three ANDs. Also, a set of steps S3104, S3106, S3108, S3110, and S3112 and a set of steps S3114, S3116, S3118, S3120, and S3122 may be interchanged.

Step S3126 may be performed at any timing after step S3102.

Figure 32:
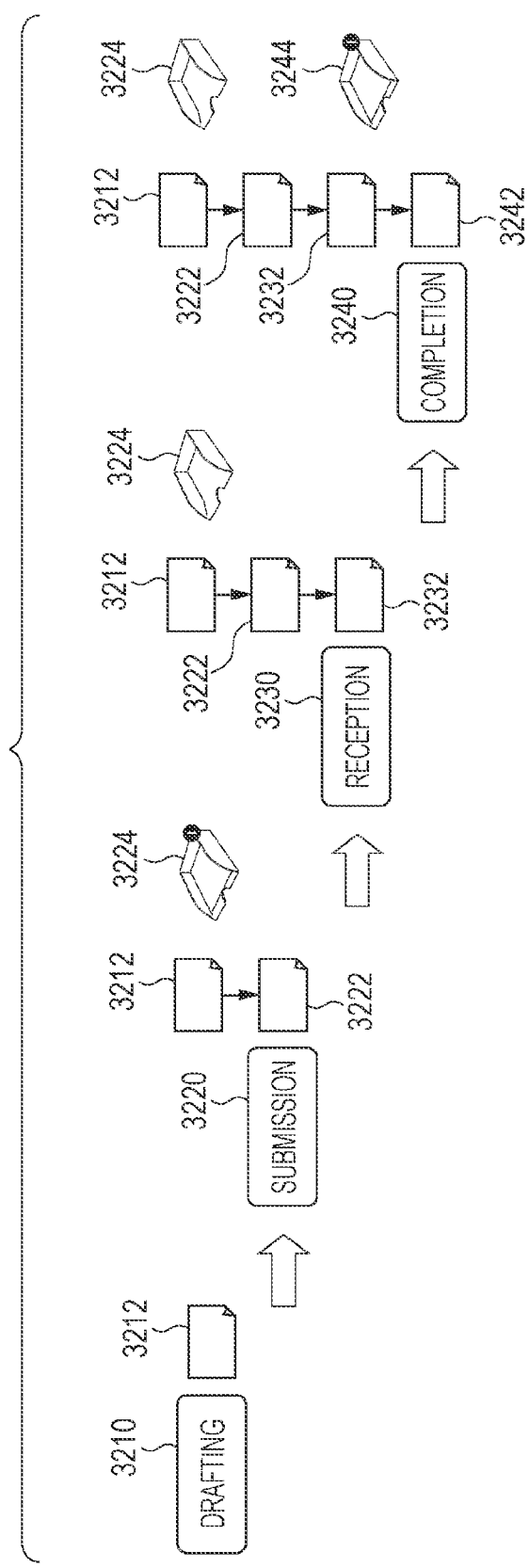
FIG. 32 is a diagram illustrating an example of a process of managing a workflow according to the exemplary embodiment.

FIG. 32 is a diagram illustrating an example of a process of managing a workflow according to the exemplary embodiment.

For example, a user A creates a document 3212 in a drafting process 3210, the user A inputs the document 3212 to an electronic tray 3224 in a submission process 3220 (the document input to the electronic tray 3224 becomes a document 3222, but the document ID thereof does not change), a user B retrieves the document 3222 from the electronic tray 3224 in a reception process 3230, the document 3222 becomes a document 3232, and the user B inputs the document 3232 to an electronic tray 3244 in a completion process 3240 (the document input to the electronic tray 3244 becomes a document 3242, but the document ID thereof does not change). In this way, electronic trays are provided for respective processes in a workflow. Accordingly, a "submitted" status occurs as a result of inputting a document to the electronic tray 3224, a "received" status occurs as a result of retrieving the document from the electronic tray 3224, and a "completed" status occurs as a result of inputting the document to the electronic tray 3244. These processes are recorded as history information regarding the document. Also, for example, if the user A inputs the document 3212 to the electronic tray 3224 and then retrieves the document 3212 from the electronic tray 3224 (of course before the user B retrieves the document 3212 from the electronic tray 3224), the operation is not recorded as history information, or is managed as a "submission canceled" status (process (B)). If the user B retrieves the document 3222 from the electronic tray 3224 and then inputs the document 3222 to the electronic tray 3224, the operation is not recorded as history information, or is managed as a "reception canceled" status (process (C)).

Figure 33:
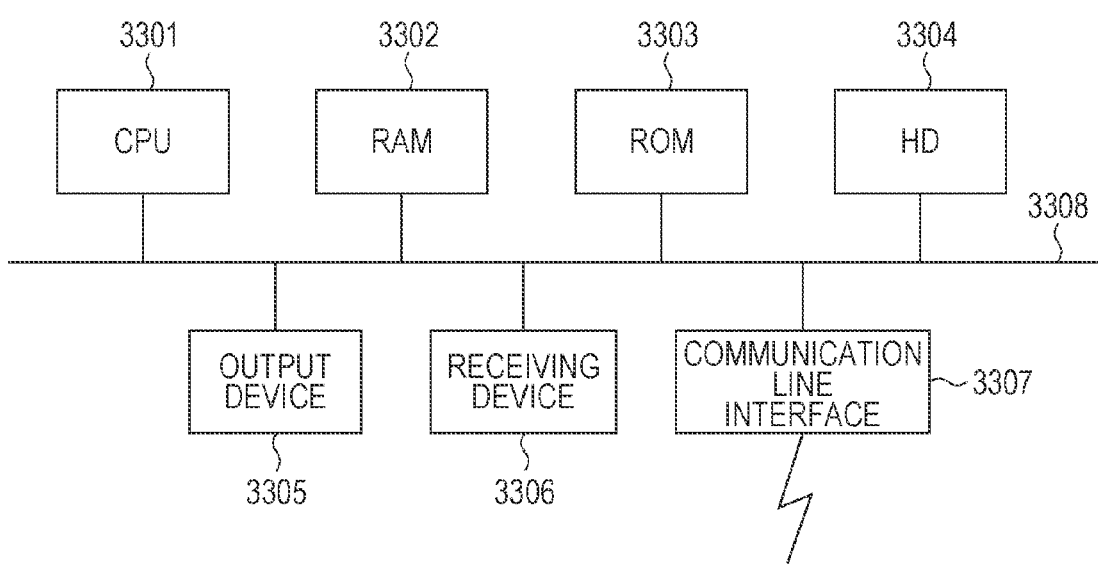
FIG. 33 is a block diagram illustrating an example of the hardware configuration of a computer according to the exemplary embodiment.

The hardware configuration of a computer that executes a program according to the exemplary embodiment is that of a typical computer, as illustrated in FIG. 33, specifically, a personal computer or a computer serving as a server. That is, a central processing unit (CPU) 3301 is used as a processing unit (operating unit), and a random access memory (RAM) 3302, a read only memory (ROM) 3303, and a hard disk (HD) 3304 are used as a storage device. A hard disk may be used as the HD 3304. The computer illustrated in FIG. 33 includes the CPU 3301, which executes a program corresponding to the electronic tray processing module 110, the operation detecting module 112, the document managing module 114, the operation history generating module 120, the operation history DB 140, the operation history display module 150, etc.; the RAM 3302 that stores the program and data; the ROM 3303 that stores a program for activating the computer; the HD 3304 serving as an auxiliary storage device; a receiving device 3306 that receives data in accordance with an operation performed on a keyboard, mouse, touch panel, or the like by a user; an output device 3305 such as a cathode ray tube (CRT) display or a liquid crystal display; a communication line interface 3307 for connecting to a communication network, such as a network interface card; and a bus 3308 for connecting these devices so that data may be transmitted and received among the devices. Plural computers, each having the above-described configuration, may be connected to one another via a network.

In the above-described exemplary embodiment, the modules based on a computer program are realized by causing the system of this hardware configuration to read the computer program serving as software, and by causing software and hardware resources to cooperate with each other. Accordingly, the above-described exemplary embodiment is realized.

The hardware configuration illustrated in FIG. 33 is one example configuration. The exemplary embodiment is not limited to the configuration illustrated in FIG. 33, and another configuration may be used as long as the modules described above in the exemplary embodiment may be executed. For example, some of the modules may be configured by dedicated hardware (for example, an application specific integrated circuit (ASIC)), and some of the modules may be included in an external system and connected via a communication line. Furthermore, plural systems, each having the configuration illustrated in FIG. 33, may be connected to one another via a communication line and may operate in cooperation with one another. In particular, the system illustrated in FIG. 33 may be incorporated in an information appliance, a copier, a facsimile, a scanner, a printer, a multifunction peripheral (an image processing apparatus having any two or more of scanner, printer, copier, and facsimile functions), or the like, instead of the personal computer.

In addition to the condition for performing the above-described process (B), a condition (B1) may be used in which a period from the end of the first operation to the start of the second operation is shorter than or equal to a predetermined value. In addition to the condition for performing the above-described process (B), a condition (B2) may be used in which, in a period from the end of the first operation to the start of the second operation, another operation is not performed on the electronic tray or an operation is not performed on another document. Also, in addition to the condition for performing the above-described process (B), the conditions B1 and B2 may be used.

In addition to the condition for performing the above-described process (C), a condition (C1) may be used in which a period from the end of the second operation to the start of the first operation is shorter than or equal to a predetermined value. In addition to the condition for performing the above-described process (C), a condition (C2) may be used in which, in a period from the end of the second operation to the start of the first operation, another operation is not performed on the electronic tray or an operation is not performed on another document. Also, in addition to the condition for performing the above-described process (C), the conditions C1 and C2 may be used.

The above-described program may be provided by being stored in a recording medium, or may be provided via a communication medium. In that case, for example, the above-described program may be regarded as a "computer readable recording medium having the program recorded thereon".

The "computer readable recording medium having the program recorded thereon" is a computer readable recording medium having the program recorded thereon, which is used for installing, executing, or circulating the program.

The following are examples of the recording medium: a DVD-R, a DVD-RW, a DVD-RAM, and the like, which are digital versatile discs (DVDs) and standards established by the DVD forum; a DVD+R, a DVD+RW, and the like, which are standards established by the DVD+RW; compact discs (CDs) such as a read only memory (CD-ROM), a CD recordable (CD-R), and a CD rewritable (CD-RW); a Blu-ray Disc (registered trademark); a magneto-optical (MO) disc; a flexible disk (FD); a magnetic tape; a hard disk; a read only memory (ROM); an electrically erasable programmable read only memory (EEPROM, registered trademark); a flash memory; a random access memory (RAM); and a secure digital (SD) memory card.

The above-described program or a part of the program may be recorded on the recording medium and may be stored or circulated. Also, the program or a part of the program may be transmitted using a transmission medium, such as a wired network including a local area network (LAN), a metropolitan area network (MAN), a wide area network (WAN), the Internet, an intranet, and an extranet, or a wireless communication network, or a combination of the wired and wireless networks, or may be carried using a carrier.

Furthermore, the above-described program may be a part of another program, or may be recorded on a recording medium together with another program. Alternatively, the program may be recorded on plural recording media in a divided manner. The program may be recorded in any form as long as the program is recoverable, for example, the program may be compressed or encrypted.

The foregoing description of the exemplary embodiment of the present invention has been provided for the purposes of illustration and description. It is not intended to be exhaustive or to limit the invention to the precise forms disclosed. Obviously, many modifications and variations will be apparent to practitioners skilled in the art. The embodiment was chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information processing apparatus comprising:
a processor;
a detecting unit that, using the processor, detects a first operation and a second operation, the first operation being an operation of inputting a document to an electronic tray that stores a document, the second operation being an operation of retrieving a document from the electronic tray; and
a history processing unit that, using the processor, performs a predetermined process related to cancellation history in a case where an operation detected by the detecting unit is the second operation, if history information indicates that the first operation has already been performed, if document identification information indicating a document on which the first operation has been performed matches document identification information indicating a document on which the second operation has been performed, and if operator identification information indicating an operator who has performed the first operation matches operator identification information indicating an operator who has performed the second operation.

2. The information processing apparatus according to claim 1, wherein the predetermined process performed by the history processing unit includes any one of
(1) not generating history information regarding the second operation detected by the detecting unit,
(2) adding status information representing cancellation to history information regarding the second operation detected by the detecting unit,
(3) not generating history information regarding the second operation detected by the detecting unit and deleting history information regarding the first operation corresponding to the second operation,
(4) adding status information representing cancellation to history information regarding the second operation detected by the detecting unit and adding status information representing cancellation to history information regarding the first operation corresponding to the second operation,
(5) adding status information representing cancellation to history information regarding the second operation by using a status definition memory that stores definitions in which operations are associated with statuses, and
(6) preparing a first status definition memory that is applied in a case where an operator who has performed the first operation is different from an operator who has performed the second operation, and a second status definition memory that is applied in a case where the operator who has performed the first operation matches the operator who has performed the second operation, and adding status information representing cancellation to history information regarding the second operation by using the second status definition memory.

3. The information processing apparatus according to claim 1,
wherein the history processing unit uses, instead of a condition that the operator identification information indicating the operator who has performed the second operation matches operator identification information in history information, a condition that a group to which the operator who has performed the second operation detected by the detecting unit belongs matches a group to which the operator who has performed the first operation in the history information belongs, by using a group memory that stores operator identification information and group identification information in association with each other, the group identification information indicating a group to which the operator indicated by the operator identification information belongs.

4. The information processing apparatus according to claim 1,
wherein the history processing unit uses, instead of a condition that the operator identification information indicating the operator who has performed the second operation matches operator identification information in history information, a condition that an authority of the operator who has performed the second operation detected by the detecting unit matches an authority of the operator who has performed the first operation in the history information, by using an authority memory that stores operator identification information and authority information in association with each other, the authority information indicating an authority of the operator indicated by the operator identification information.

5. The information processing apparatus according to claim 1, further comprising:
a display that displays, by using the history information, which job has been performed on a document in a workflow including a plurality of jobs.

6. An information processing apparatus comprising:
a processor;
a detecting unit that, using the processor, detects a first operation and a second operation, the first operation being an operation of inputting a document to an electronic tray that stores a document, the second operation being an operation of retrieving a document from the electronic tray; and
a history processing unit that, using the processor, performs a predetermined process related to cancellation history in a case where an operation detected by the detecting unit is the first operation, if history information indicates that the second operation has already been performed, if document identification information indicating a document on which the second operation has been performed matches document identification information indicating a document on which the first operation has been performed, and if operator identification information indicating an operator who has performed the second operation matches operator identification information indicating an operator who has performed the first operation.

7. The information processing apparatus according to claim 6, wherein the predetermined process performed by the history processing unit includes any one of
(1) not generating history information regarding the first operation detected by the detecting unit,
(2) adding status information representing cancellation to history information regarding the first operation detected by the detecting unit,
(3) not generating history information regarding the first operation detected by the detecting unit and deleting history information regarding the second operation corresponding to the first operation,
(4) adding status information representing cancellation to history information regarding the first operation detected by the detecting unit and adding status information representing cancellation to history information regarding the second operation corresponding to the first operation,
(5) adding status information representing cancellation to history information regarding the first operation by using a status definition memory that stores definitions in which operations are associated with statuses, and
(6) preparing a first status definition memory that is applied in a case where an operator who has performed the first operation is different from an operator who has performed the second operation, and a second status definition memory that is applied in a case where the operator who has performed the first operation matches the operator who has performed the second operation, and adding status information representing cancellation to history information regarding the first operation by using the second status definition memory.

8. The information processing apparatus according to claim 6,
wherein the history processing unit uses, instead of a condition that the operator identification information indicating the operator who has performed the first operation matches operator identification information in history information, a condition that a group to which the operator who has performed the first operation detected by the detecting unit belongs matches a group to which the operator who has performed the second operation in the history information belongs, by using a group memory that stores operator identification information and group identification information in association with each other, the group identification information indicating a group to which the operator indicated by the operator identification information belongs.

9. The information processing apparatus according to claim 6,
wherein the history processing unit uses, instead of a condition that the operator identification information indicating the operator who has performed the first operation matches operator identification information in history information, a condition that an authority of the operator who has performed the first operation detected by the detecting unit matches an authority of the operator who has performed the second operation in the history information, by using an authority memory that stores operator identification information and authority information in association with each other, the authority information indicating an authority of the operator indicated by the operator identification information.

10. The information processing apparatus according to claim 6, further comprising:
a display that displays, by using the history information, which job has been performed on a document in a workflow including a plurality of jobs.

11. An information processing apparatus comprising:
a processor;
a detecting unit that, using the processor, detects a first operation and a second operation, the first operation being an operation of inputting a document to an electronic tray that stores a document, the second operation being an operation of retrieving a document from the electronic tray; and
a history processing unit that, using the processor, performs a predetermined process related to cancellation history in a case where an operation detected by the detecting unit is the second operation, if history information indicates that the first operation has already been performed, if document identification information indicating a document on which the first operation has been performed matches document identification information indicating a document on which the second operation has been performed, and if operator identification information indicating an operator who has performed the first operation matches operator identification information indicating an operator who has performed the second operation, and
that performs a predetermined process related to cancellation history in a case where an operation detected by the detecting unit is the first operation, if history information indicates that the second operation has already been performed, if document identification information indicating a document on which the second operation has been performed matches document identification information indicating a document on which the first operation has been performed, and if operator identification information indicating an operator who has performed the second operation matches operator identification information indicating an operator who has performed the first operation.

12. A non-transitory computer readable medium storing an information processing program causing a computer to execute a process, the process comprising:
detecting a first operation and a second operation, the first operation being an operation of inputting a document to an electronic tray that stores a document, the second operation being an operation of retrieving a document from the electronic tray; and
performing a predetermined process related to cancellation history in a case where an operation detected in the detecting is the second operation, if history information indicates that the first operation has already been performed, if document identification information indicating a document on which the first operation has been performed matches document identification information indicating a document on which the second operation has been performed, and if operator identification information indicating an operator who has performed the first operation matches operator identification information indicating an operator who has performed the second operation.

13. A non-transitory computer readable medium storing an information processing program causing a computer to execute a process, the process comprising:

detecting a first operation and a second operation, the first operation being an operation of inputting a document to an electronic tray that stores a document, the second operation being an operation of retrieving a document from the electronic tray; and performing a predetermined process related to cancellation history in a case where an operation detected in the detecting is the first operation, if history information indicates that the second operation has already been performed, if document identification information indicating a document on which the second operation has been performed matches document identification information indicating a document on which the first operation has been performed, and if operator identification information indicating an operator who has performed the second operation matches operator identification information indicating an operator who has performed the first operation.

14. A non-transitory computer readable medium storing an information processing program causing a computer to execute a process, the process comprising:

detecting a first operation and a second operation, the first operation being an operation of inputting a document to an electronic tray that stores a document, the second operation being an operation of retrieving a document from the electronic tray;

performing a predetermined process related to cancellation history in a case where an operation detected in the detecting is the second operation, if history information indicates that the first operation has already been performed, if document identification information indicating a document on which the first operation has been performed matches document identification information indicating a document on which the second operation has been performed, and if operator identification information indicating an operator who has performed the first operation matches operator identification information indicating an operator who has performed the second operation; and performing a predetermined process related to cancellation history in a case where an operation detected in the detecting is the first operation, if history information indicates that the second operation has already been performed, if document identification information indicating a document on which the second operation has been performed matches document identification information indicating a document on which the first operation has been performed, and if operator identification information indicating an operator who has performed the second operation matches operator identification information indicating an operator who has performed the first operation.

* * * * *